(12) United States Patent
Lee

(10) Patent No.: US 9,335,552 B2
(45) Date of Patent: May 10, 2016

(54) IMAGE DISPLAY APPARATUS AND METHOD FOR OPERATING THE SAME

(71) Applicant: Yonguk Lee, Seoul (KR)

(72) Inventor: Yonguk Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 412 days.

(21) Appl. No.: 13/741,455

(22) Filed: Jan. 15, 2013

(65) Prior Publication Data

US 2013/0257928 A1 Oct. 3, 2013

(30) Foreign Application Priority Data

Apr. 3, 2012 (KR) ........................ 10-2012-0034538

(51) Int. Cl.
*G02B 27/22* (2006.01)
*H04N 13/04* (2006.01)

(52) U.S. Cl.
CPC ............ *G02B 27/22* (2013.01); *H04N 13/0404* (2013.01); *H04N 13/047* (2013.01); *H04N 13/0484* (2013.01)

(58) Field of Classification Search
CPC ........ G02B 27/22; G06T 15/00; H04N 13/04; H04N 13/0404; H04N 13/0484; H04N 13/0447; H04N 13/047
USPC ........................ 345/204, 419, 697; 348/51, 54
See application file for complete search history.

(56) References Cited

U.S. PATENT DOCUMENTS

2008/0079805 A1* 4/2008 Takagi et al. ................... 348/51
2011/0285700 A1* 11/2011 Kim et al. ..................... 345/419
2012/0044330 A1* 2/2012 Watanabe ........................ 348/54
2012/0081358 A1* 4/2012 Nakamura et al. ............ 345/419

FOREIGN PATENT DOCUMENTS

WO WO 2011/063993 A1 6/2011
WO WO 2012/026372 A1 3/2012

OTHER PUBLICATIONS

European Search Report dated Jan. 2, 2014 issued in Application No. 13 15 8911.

* cited by examiner

*Primary Examiner* — Lun-Yi Lao
*Assistant Examiner* — Johny Lau
(74) *Attorney, Agent, or Firm* — Ked & Associates LLP

(57) ABSTRACT

An image display apparatus and a method for operating the same are disclosed. The image display apparatus includes a display for displaying multi-viewpoint images, a lens unit disposed in front of the display, for separating the multi-viewpoint images according to directions, and a controller for, if at least a part of viewpoint images perceived to the left and right eyes of a first viewer are overlapped between the left and right eyes of the first viewer, controlling processing of at least a part of the overlapped viewpoint images as black.

12 Claims, 21 Drawing Sheets

Fig 1.
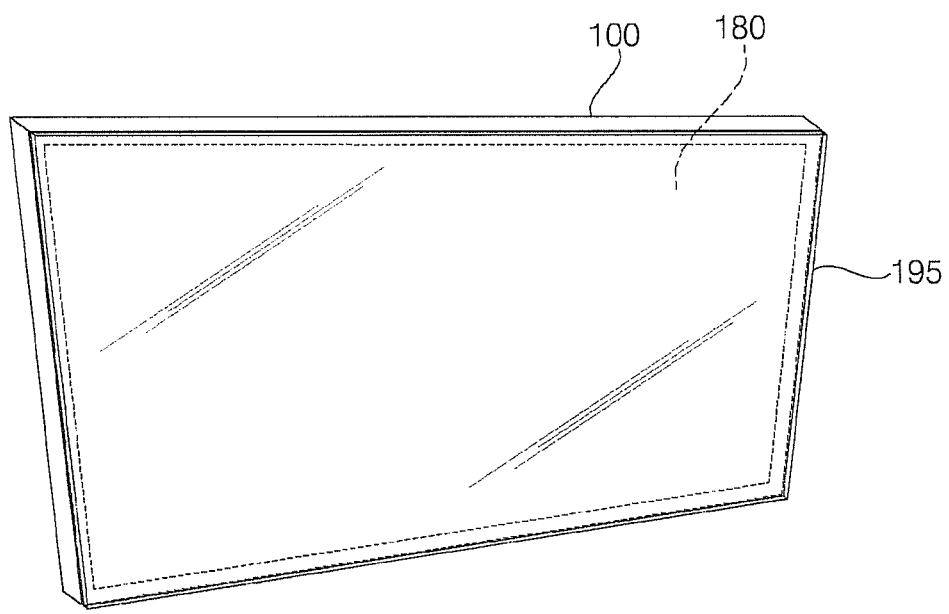
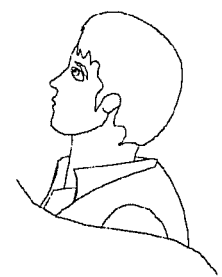

Fig 9.
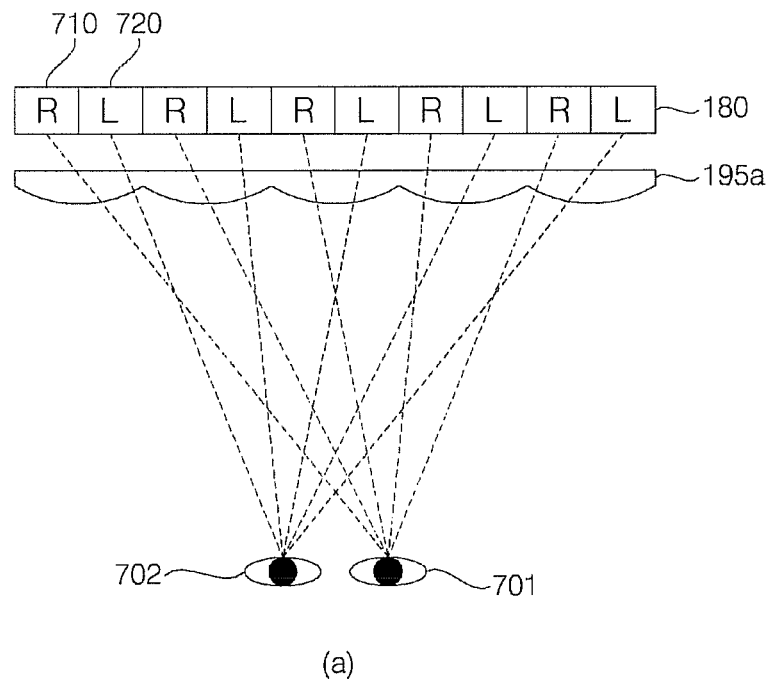
(a)
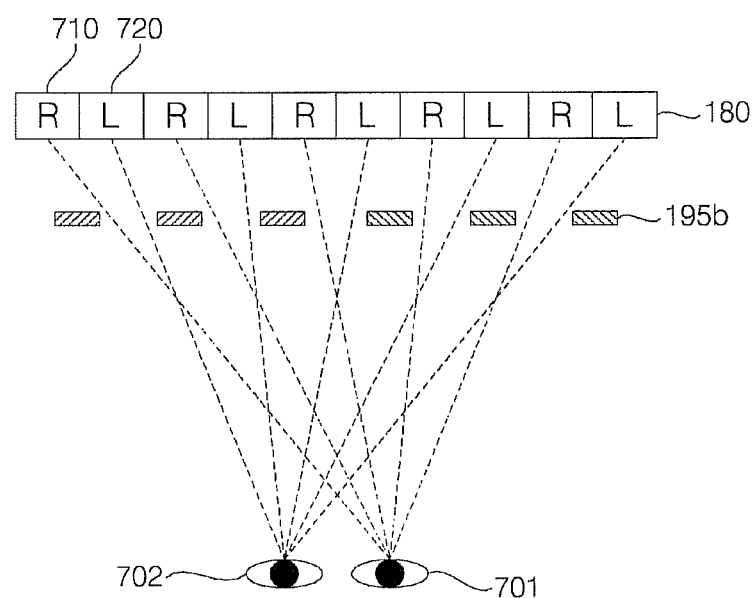
(b)

Fig 11.
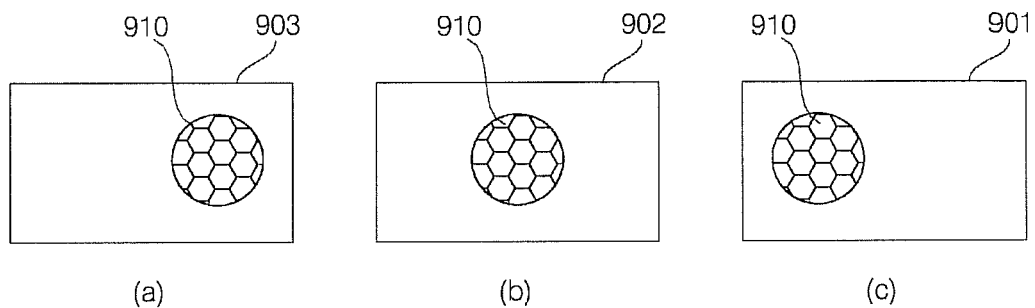
(a)  (b)  (c)
Fig 12.
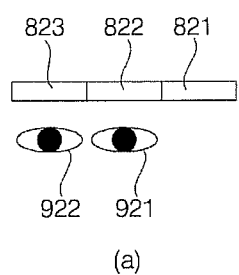
(a)
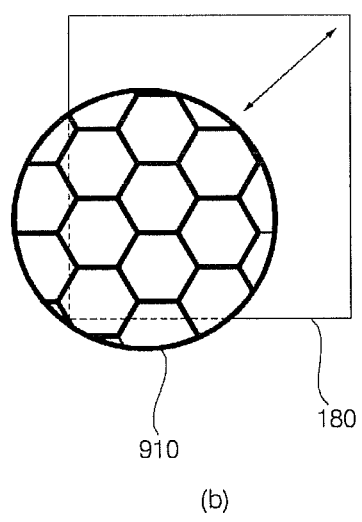
(b)

IMAGE DISPLAY APPARATUS AND METHOD FOR OPERATING THE SAME

CROSS-REFERENCE TO RELATED APPLICATION

This application claims the benefit of Korean Patent Application No. 10-2012-0034538, filed on Apr. 3, 2012 in the Korean Intellectual Property Office, the disclosure of which is incorporated herein by reference.

BACKGROUND OF THE INVENTION

1. Field of the invention

The present invention relates to an image display apparatus and a method for operating the same, and more particularly, to an image display apparatus and a method for operating the same, which can increase user convenience during glasses-free three-dimensional (3D) visualization.

2. Description of the Related Art

An image display apparatus has a function of displaying images to a user. The image display apparatus can display a broadcast program selected by the user on a display from among broadcast programs transmitted from broadcasting stations. The recent trend in broadcasting is a worldwide shift from analog broadcasting to digital broadcasting.

As it transmits digital audio and video signals, digital broadcasting offers many advantages over analog broadcasting, such as robustness against noise, less data loss, ease of error correction, and the ability to provide high-definition, clear images. Digital broadcasting also allows interactive viewer services, compared to analog broadcasting.

SUMMARY OF THE INVENTION

Therefore, the present invention has been made in view of the above problems, and it is an object of the present invention to provide an image display apparatus and a method for operating the same, which can increase user convenience during glasses-free three-dimensional (3D) visualization.

It is another object of the present invention to provide an image display apparatus and a method for operating the same, which can display a 3D image stably when a plurality of users view a glasses-free 3D image.

In accordance with an aspect of the present invention, the above and other objects can be accomplished by the provision of an image display apparatus including a display for displaying multi-viewpoint images, a lens unit disposed in front of the display, for separating the multi-viewpoint images according to directions, and a controller for, if at least one of viewpoint images perceived to the left and right eyes of a first viewer are overlapped between the left and right eyes of the first viewer, controlling processing of at least a part of the overlapped viewpoint images as black.

In accordance with another aspect of the present invention, there is provided a method for operating an image display apparatus that displays multi-viewpoint images, including receiving first position information being information about positions of the left and right eyes of a first viewer, determining viewpoint images perceived to the left eye of the first viewer and viewpoint images perceived to the right eye of the first viewer, using the first position information, and processing, if at least one of the viewpoint images perceived to the left and right eyes of the first viewer are overlapped between the left and right eyes of the first viewer, at least a part of the overlapped viewpoint images as black, and displaying the viewpoint images including the processed viewpoint images.

BRIEF DESCRIPTION OF THE DRAWINGS

The above and other objects, features and other advantages of the present invention will be more clearly understood from the following detailed description taken in conjunction with the accompanying drawings, in which:

FIG. 1 illustrates the exterior of an image display apparatus according to an embodiment of the present invention;

FIG. 9 is a view referred to for describing the operation principles of glasses-free 3D image display apparatuses;

FIGS. 10 to 14 are views referred to for describing the operation principle of an image display apparatus that displays multi-viewpoint images;

DETAILED DESCRIPTION OF THE PREFERRED EMBODIMENTS

Embodiments of the present invention will be described below with reference to the attached drawings.

The terms "module" and "unit" used to signify components are used herein to help the understanding of the components and thus they should not be considered as having specific meanings or roles. Accordingly, the terms "module" and "unit" may be used interchangeably.

Figure 2:
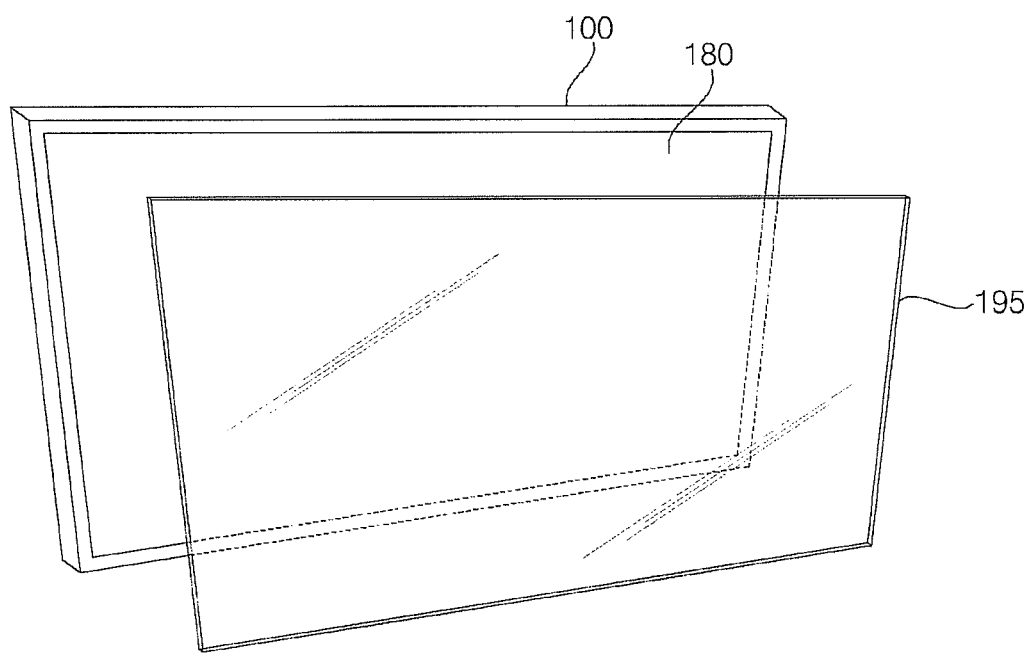
FIG. 2 illustrates a lens unit and a display which are separated from each other in the image display apparatus illustrated in FIG. 1.

FIG. 1 illustrates the exterior of an image display apparatus according to an embodiment of the present invention and FIG. 2 illustrates a lens unit and a display which are separated from each other in the image display apparatus illustrated in FIG. 1.

Referring to FIGS. 1 and 2, the image display apparatus according to the embodiment of the present invention is capable of displaying a stereoscopic image, that is, a three-dimensional (3D) image. In the embodiment of the present invention, the image display apparatus is capable of displaying a glasses-free 3D image, by way of example.

For glasses-free 3D visualization, an image display apparatus 100 includes a display 180 and a lens unit 195.

The display 180 can display a received image, particularly multi-viewpoint images in the embodiment of the present invention. Specifically, the sub-pixels of the multi-viewpoint images may be displayed arranged in a specific pattern.

The lens unit 195 may be disposed toward a user, apart from the display 180 by a predetermined gap. The display 180 and the lens unit 195 are shown in FIG. 2 as separated from each other.

The lens unit 195 may operate in a lenticular scheme using a lenticular lens, a parallax scheme using a slit array, and a microlens array scheme. The following description is made in the context of the lenticular scheme.

Figure 3:
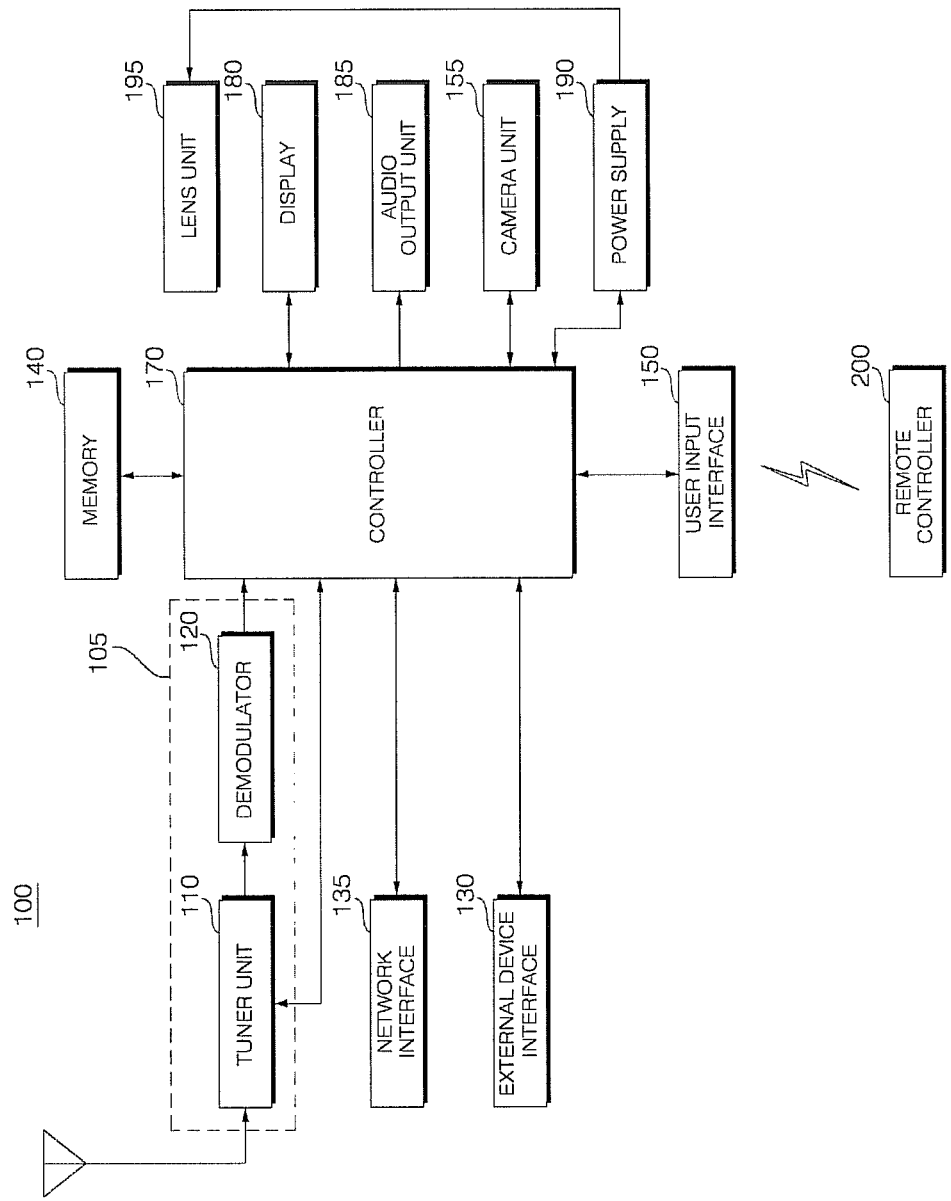
FIG. 3 is a block diagram of the image display apparatus according to an embodiment of the present invention.

FIG. 3 is a block diagram of the image display apparatus according to an embodiment of the present invention.

Referring to FIG. 1, the image display apparatus 100 according to an embodiment of the present invention includes a broadcasting receiver 105, an external device interface 130, a memory 140, a user input interface 150, a camera unit 155, a controller 170, the display 180, an audio output unit 185, a power supply 190, and the lens unit 195.

The broadcasting receiver 105 may include a tuner unit 110, a demodulator 120, and a network interface 135. As needed, the broadcasting receiver 105 may be configured so as to include only the tuner unit 110 and the demodulator 120 or only the network interface 135.

The tuner unit 110 selects a Radio Frequency (RF) broadcast signal corresponding to a channel selected by a user or an RF broadcast signal corresponding to each of pre-stored channels from among a plurality of RF broadcast signals received through an antenna and downconverts the selected RF broadcast signal into a digital Intermediate Frequency (IF) signal or an analog baseband Audio/Video (A/V) signal.

More specifically, if the selected RF broadcast signal is a digital broadcast signal, the tuner unit 110 downconverts the selected RF broadcast signal into a digital IF signal, DIF. On the other hand, if the selected RF broadcast signal is an analog broadcast signal, the tuner unit 110 downconverts the selected RF broadcast signal into an analog baseband A/V signal, CVBS/SIF. That is, the tuner unit 110 may be a hybrid tuner capable of processing not only digital broadcast signals but also analog broadcast signals. The analog baseband A/V signal CVBS/SIF may be directly input to the controller 170.

The tuner unit 110 may be capable of receiving RF broadcast signals from an Advanced Television Systems Committee (ATSC) single-carrier system or from a Digital Video Broadcasting (DVB) multi-carrier system.

The tuner unit 110 may sequentially select a number of RF broadcast signals corresponding to all broadcast channels previously stored in the image display apparatus 100 by a channel add function from a plurality of RF signals received through the antenna and may downconvert the selected RF broadcast signals into IF signals or baseband A/V signals.

The tuner unit 110 may include a plurality of tuners for receiving broadcast signals on a plurality of channels. Alternatively, the tuner unit 110 may be implemented into a single tuner for simultaneously receiving broadcast signals on a plurality of channels.

The demodulator 120 receives the digital IF signal DIF from the tuner unit 110 and demodulates the digital IF signal DIF.

The demodulator 120 may perform demodulation and channel decoding on the digital IF signal DIF, thereby obtaining a stream signal TS. The stream signal TS may be a signal in which a video signal, an audio signal and a data signal are multiplexed.

The stream signal TS may be input to the controller 170 and thus subjected to demultiplexing and A/V signal processing. The processed video and audio signals are output to the display 180 and the audio output unit 185, respectively.

The external device interface 130 may transmit data to or receive data from an external device (not shown) connected to the image display apparatus 100. For data transmission and reception, the external device interface 130 may include an A/V Input/Output (I/O) unit (not shown) and/or a wireless communication module (not shown).

The external device interface 130 may be connected to an external device such as a Digital Versatile Disk (DVD) player, a Blu-ray player, a game console, a camera, a camcorder, a computer (e.g., a laptop computer), or a set-top box, wirelessly or by wire. Then, the external device interface 130 may transmit and receive signals to and from the external device.

The A/V I/O unit of the external device interface 130 may receive video, audio, and/or data signals from the external device. The wireless communication module of the external device interface 130 may perform short-range wireless communication with other electronic devices.

The network interface 135 serves as an interface between the image display apparatus 100 and a wired/wireless network such as the Internet. The network interface 135 may receive content or data from the Internet, a Content Provider (CP), or a Network Provider (NP).

The memory 140 may store various programs necessary for the controller 170 to process and control signals, and may also store processed video, audio and data signals.

The memory 140 may temporarily store a video, audio and/or data signal received from the external device interface 130. The memory 140 may store information about broadcast channels by the channel-add function such as a channel map.

While the memory 140 is shown in FIG. 3 as configured separately from the controller 170, to which the present invention is not limited, the memory 140 may be incorporated into the controller 170, for example.

The user input interface 150 transmits a signal received from the user to the controller 170 or transmits a signal received from the controller 170 to the user.

For example, the user input interface 150 may receive various user input signals such as a power-on/off signal, a channel selection signal, and a screen setting signal from a remote controller 200, provide the controller 170 with user input signals received from local keys (not shown), such as inputs of a power key, a channel key, and a volume key, and a setting key, transmit a control signal received from a sensor unit (not shown) for sensing a user gesture to the controller 170, or transmit a signal received from the controller 170 to the sensor unit.

The controller 170 may demultiplex the stream signal TS received from the tuner unit 110, the demodulator 120, or the external device interface 130 into a number of signals and process the demultiplexed signals into audio and video data.

The video signal processed by the controller 170 may be displayed as an image on the display 180. The video signal processed by the controller 170 may also be transmitted to an external output device through the external device interface 130.

The audio signal processed by the controller 170 may be output to the audio output unit 185. Also, the audio signal processed by the controller 170 may be transmitted to the external output device through the external device interface 130.

While not shown in FIG. 3, the controller 170 may include a demultiplexer (DEMUX) and a video processor, which will be described later with reference to FIG. 4.

In addition, the controller 170 may provide overall control to the image display apparatus 100. For example, the controller 170 may control the tuner unit 110 to select an RF broadcast signal corresponding to a user-selected channel or a pre-stored channel.

The controller 170 may control the image display apparatus 100 according to a user command received through the user input interface 150 or according to an internal program.

The controller 170 may also control the display 180 to display images. The image displayed on the display 180 may be a two-Dimensional (2D) or 3D still image or a 2D or 3D video.

The controller 170 may control a particular object in the image displayed on the display 180 to be rendered as a 3D object. For example, the particular object may be at least one of a linked Web page (e.g. from a newspaper, a magazine, etc.), an Electronic Program Guide (EPG), a menu, a widget, an icon, a still image, a moving picture, or text.

This 3D object may be processed to have a different depth from the image displayed on the display 180. Preferably, the 3D object may appear protruding relative to the image displayed on the display 180.

The controller 170 may locate the user based on an image captured by the camera unit 155. Specifically, the controller 170 may measure the distance (a z-axis coordinate) between the user and the image display apparatus 100. In addition, the controller 170 may calculate x-axis and y-axis coordinates corresponding to the position of the user on the display 180.

The image display apparatus 100 may further include a channel browsing processor (not shown) for generating thumbnail images corresponding to channel signals or external input signals. The channel browsing processor may extract some of the video frames of each of stream signals TS received from the demodulator 120 or stream signals received from the external device interface 130 and display the extracted video frames on the display 180 as thumbnail images. The thumbnail images may be output to the controller 170 after they are processed together with a decoded image by stream decoding. The controller 170 may display a thumbnail list including a plurality of received thumbnail images on the display 180.

The thumbnail list may be displayed on a part of the display 180 with an image displayed on the display 180, that is, as a compact view, or the thumbnail list may be displayed in full screen on the display 180. The thumbnail images of the thumbnail list may be updated sequentially.

The display 180 generates drive signals by converting a processed video signal, a processed data signal, an On Screen Display (OSD) signal, and a control signal received from the controller 170 or a video signal, a data signal, and a control signal received from the external device interface 130.

The display 180 may be various types of displays such as a Plasma Display Panel (PDP), a Liquid Crystal Display (LCD), an Organic Light-Emitting Diode (OLED) display, and a flexible display. The display 180 may also be capable of displaying 3D images.

As described before, the display 180 is capable of glasses-free 3D images, which obviates the need for using special 3D glasses to view 3D images. For glasses-free 3D imaging, the lens unit 195 operating in the lenticular scheme is provided.

The power supply 190 supplies power to the image display apparatus 100 so that each module or unit may operate in the image display apparatus 100.

The display 180 may be configured so as to include a 2D image area and a 3D image area. In this case, the power supply 190 may supply different first and second power voltages to the lens unit 195. The first and second power voltages may be supplied under the control of the controller 170.

The lens unit 195 changes the traveling direction of light according to a received power voltage.

The first power voltage may be applied to a first area of the lens unit 195 corresponding to the 2D image area of the display 180. Then the lens unit 195 may emit light in the same direction as light from the 2D image area of the display 180. Therefore, the user can perceive a displayed 2D image as it is.

The second power voltage may be applied to a second area of the lens unit 195 corresponding to the 3D image area of the display 180. Then light from the 3D image area of the display 180 is scattered. Due to the resulting 3D effect, the user is tricked into perceiving a displayed 3D image without wearing 3D glasses.

The lens unit 195 may be disposed toward the user, apart from the display 180. Especially, the lens unit 195 may be parallel to the display 180 or tilted at a predetermined angle with respect to the display 180. The lens unit 195 may be concave or convex. The lens unit 195 may take the form of a sheet. Thus, the lens unit 195 may be referred to as a lens sheet in the embodiment of the present invention.

The display 180 may also be a touch screen that can be used not only as an output device but also as an input device.

The audio output unit 185 may receive a processed audio signal from the controller 170 and output the received audio signal as voice.

The camera unit 155 captures a user. The camera unit 155 may include, but not limited to, a single camera. When needed, the camera unit 155 may include a plurality of cameras. The camera unit 155 may be embedded above the display 180 in the image display apparatus 100, or may be separately configured. Image information captured by the camera unit 155 may be provided to the controller 170.

The controller 170 may sense a user's gesture from a captured image received from the camera unit 155 or from signals received from the sensor unit (not shown) alone or in combination.

The remote controller 200 transmits a user input to the user input interface 150. For the transmission of a user input, the remote controller 200 may operate based on various communication standards such as Bluetooth, RF, InfraRed (IR), Ultra WideBand (UWB), and ZigBee. In addition, the remote controller 200 may receive a video signal, audio signal and/or data signal from the user input interface 150 and output the received signal as an image or sound.

The above-described image display apparatus 100 may be a fixed or mobile digital broadcast receiver.

The image display apparatus 100 as set forth herein may be any of a TV receiver, a monitor, a mobile phone, a smart phone, a laptop computer, a digital broadcast terminal, a Personal Digital Assistant (PDA), a Portable Multimedia Player (PMP), etc.

The block diagram of the image display apparatus 100 illustrated in FIG. 3 is an exemplary embodiment of the present invention. The image display apparatus 100 is shown in FIG. 3 as having a number of components in a given configuration. However, the image display apparatus 100 may include fewer components or more components than those shown in FIG. 1 in alternative embodiments. Also, two or more components of the image display apparatus 100 may be combined into a single component or a single component thereof may be separated into two more components in alternative embodiments. The functions of the components of the image display apparatus 100 as set forth herein are illustrative in nature and may be modified, for example, to meet the requirements of a given application.

Unlike the configuration illustrated in FIG. 3, the image display apparatus 100 may be configured so as to receive and playback video content through the network interface 130 or the external device interface 135, without the tuner unit 100 and the demodulator 120.

The image display apparatus 100 is an example of image signal processing apparatus that processes a stored image or an input image. Other examples of the image signal processing apparatus include a set-top box without the display 180 and the audio output unit 185 illustrated in FIG. 3, a DVD player, a Blu-ray player, a game console, and a computer.

Figure 4:
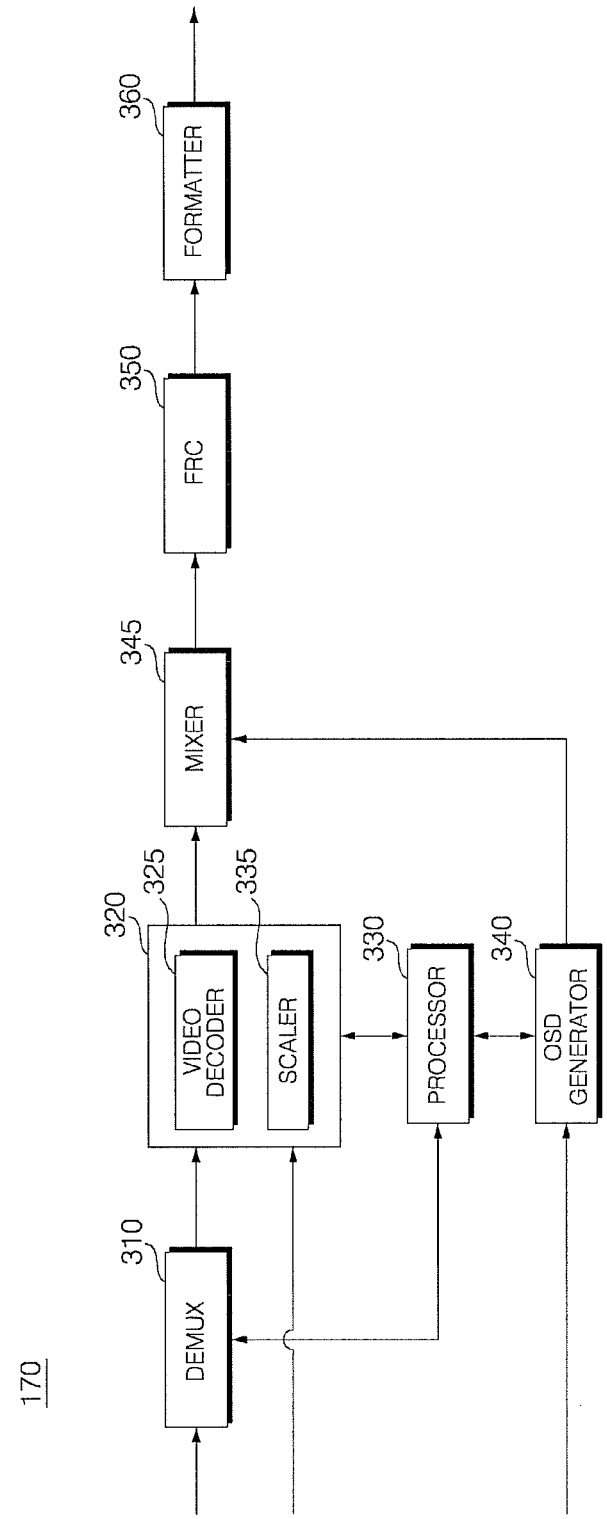
FIG. 4 is a block diagram of a controller illustrated in FIG. 3.

FIG. 4 is a block diagram of the controller illustrated in FIG. 3.

Referring to FIG. 3, the controller 170 may include a DEMUX 310, a video processor 320, a processor 330, an OSD generator 340, a mixer 345, a Frame Rate Converter (FRC) 350, and a formatter 360 according to an embodiment of the present invention. The controller 170 may further include an audio processor (not shown) and a data processor (not shown).

The DEMUX 310 demultiplexes an input stream. For example, the DEMUX 310 may demultiplex an MPEG-2 TS into a video signal, an audio signal, and a data signal. The input stream signal may be received from the tuner unit 110, the demodulator 120 or the external device interface 130.

The video processor 320 may process the demultiplexed video signal. For video signal processing, the video processor 320 may include a video decoder 325 and a scaler 335.

The video decoder 325 decodes the demultiplexed video signal and the scaler 335 scales the resolution of the decoded video signal so that the video signal can be displayed on the display 180.

The video decoder 325 may be provided with decoders that operate in conformance to various standards.

The decoded video signal processed by the video processor 320 may be a 2D video signal, a 3D video signal, or a combination of both.

For example, it may be determined whether an external video signal received from an external device or a video signal included in a broadcast signal received from the tuner unit 110 is a 2D signal, a 3D signal, or a combination of both. Accordingly, the controller 170, particularly the video processor 320 processes the video signal and outputs a 2D video signal, a 3D video signal, or a combination of both.

The decoded video signal from the video processor 320 may have any of various available formats. For example, the decoded video signal may be a 3D video signal with a color image and a depth image or a 3D video signal with multi-viewpoint image signals. The multi-viewpoint image signals may include, for example, a left-eye image signal and a right-eye image signal.

For 3D visualization, available 3D formats are a side-by-side format, a top/down format, a frame sequential format, an interlaced format, and a checker box format. A left-eye image L and a right-eye image R are arranged side by side in the side by side format. The left-eye image L and the right-eye image R are stacked vertically in the top/down format, while they are arranged in time division in the frame sequential format. In the interlaced format, the left-eye image L and the right-eye image R alternate line by line. The left-eye image L and the right-eye image R are mixed on a box basis in the checker box format.

The processor 330 may provide overall control to the image display apparatus 100 or the controller 170. For example, the processor 330 may control the tuner unit 110 to tune to an RF broadcasting corresponding to a user-selected channel or a pre-stored channel.

The processor 330 may also control the image display apparatus 100 according to a user command received through the user input interface 150 or an internal program.

The processor 330 may control data transmission through the network interface 135 or the external device interface 130.

The processor 330 may control operations of the DEMUX 310, the video processor 320, and the OSD generator 340 in the controller 170.

The OSD generator 340 generates an OSD signal autonomously or according to a user input. For example, the OSD generator 340 may generate signals by which a variety of information is displayed as graphics or text on the display 180, according to user input signals. The OSD signal may include various data such as a User Interface (UI), a variety of menus, widgets, icons, etc. Also, the OSD signal may include a 2D object and/or a 3D object.

Further, the OSD generator 340 may generate a pointer to be displayed on the display 180 based on a pointing signal received from the remote controller 200. Especially, the pointer may be generated from a pointing signal processor (not shown), which may reside in the OSD generator 240. Obviously, the pointing signal processor may be configured separately.

The mixer 345 may mix the decoded video signal processed by the video processor 320 with the OSD signal generated from the OSD generator 340. The OSD signal and the decoded video signal each may include at least one of a 2D signal or a 3D signal. The mixed video signal is provided to the FRC 350.

The FRC 350 may change the frame rate of the mixed video signal or simply output the mixed video signal without frame rate conversion.

The formatter 360 may arrange left-eye and right-eye video frames of the frame rate-converted 3D image.

The formatter 360 may separate a 2D video signal and a 3D video signal from the mixed video signal of the OSD signal and the decoded video signal received from the mixer 345.

Herein, a 3D video signal refers to a signal including a 3D object such as a Picture-In-Picture (PIP) image (still image or video), an EPG that describes broadcast programs, a menu, a widget, an icon, text, an object within an image, a person, a background, or a Web page (e.g. from a newspaper, a magazine, etc.).

The formatter 360 may change the format of the 3D video signal. For example, upon receipt of a 3D image in one of the afore-described 3D formats, the formatter 360 may convert the received 3D image into multi-viewpoint images, especially in such a manner that the multi-viewpoint images are repeated. Accordingly, glasses-free 3D images can be displayed.

Meanwhile, the formatter 360 may convert a 2D video signal to a 3D video signal. For example, the formatter 360 may detect edges or a selectable object from the 2D video signal and generate a 3D video signal with an object based on the detected edges or the selectable object. As described before, the 3D video signal may be a multi-viewpoint image signal.

A 3D processor (not shown) may further be provided after the formatter 360, for processing a signal to exert 3D effects. For enhancing 3D effects, the 3D processor may adjust the brightness, tint, and color of a video signal.

The audio processor (not shown) of the controller 170 may process the demultiplexed audio signal. For the audio signal processing, the audio processor may have a plurality of decoders.

The audio processor of the controller 170 may also adjust the bass, treble, and volume of the audio signal.

The data processor (not shown) of the controller 170 may process the data signal obtained by demultiplexing the input stream signal. For example, if the demultiplexed data signal is a coded data signal, the data processor may decode the coded data signal. The coded data signal may be an EPG which includes broadcast information specifying the start time, end time, etc. of scheduled broadcast TV or radio programs.

While it is shown in FIG. 4 that the mixer 345 mixes signals received from the OSD generator 340 and the video processor 320 and then the formatter 360 performs 3D processing on the mixed signal, to which the present invention is not limited, the mixer 345 may be positioned after the formatter 360. Thus the formatter 360 may perform 3D processing on a signal received from the video processor 320, the OSD generator 340 may generate an OSD signal and subject the OSD signal to 3D processing, and then the mixer 345 may mix the processed 3D signals received from the formatter 360 and the OSD generator 340.

The block diagram of the image display apparatus 100 illustrated in FIG. 4 is purely exemplary. Depending upon the specifications of the image display apparatus 100 in actual implementation, the components of the image display apparatus 100 may be combined or omitted or new components may be added. That is, two or more components are incorporated into one component or one component may be configured as separate components, as needed.

Especially, the FRC 350 and the formatter 360 may be configured separately outside the controller 170.

Figure 5:
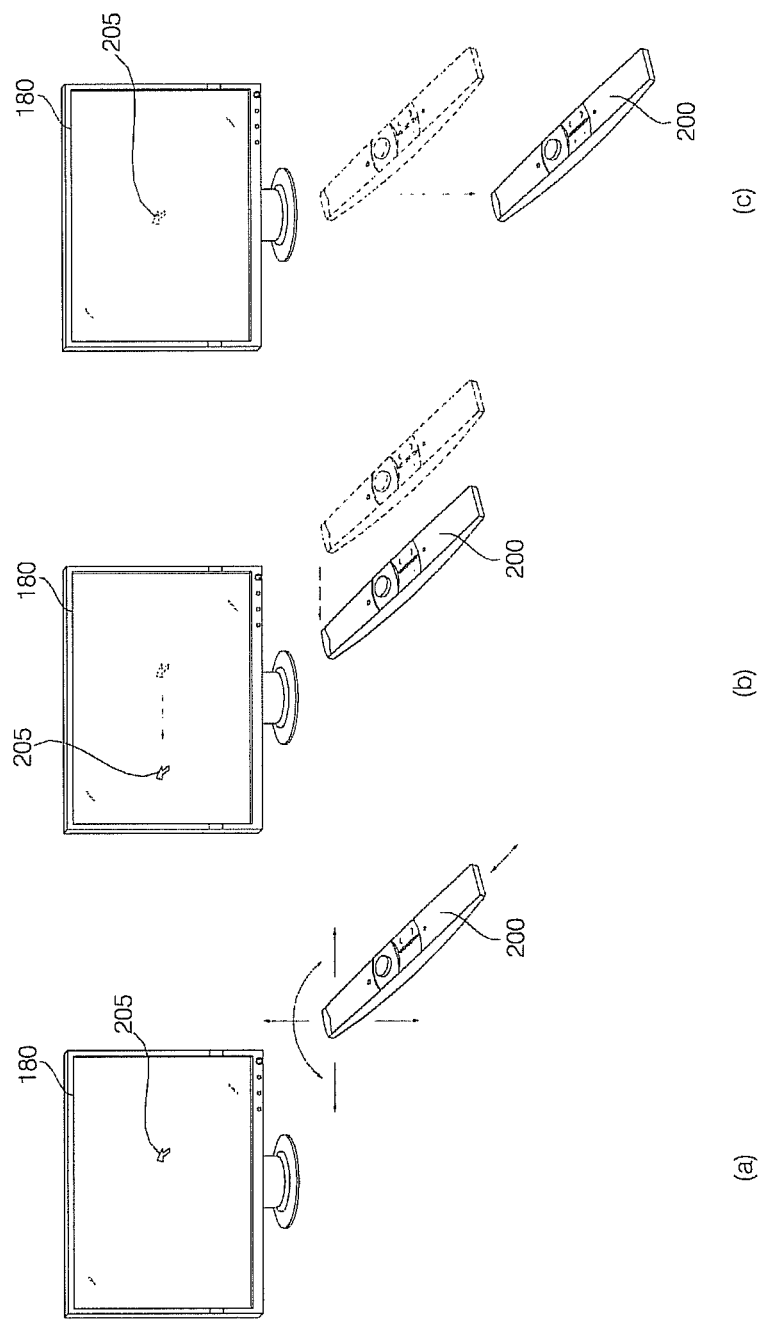
FIG. 5 is a method for controlling a remote controller illustrated in FIG. 3.

FIG. 5 illustrates a method for controlling the remote controller illustrated in FIG. 3 according to an embodiment of the present invention.

FIG. 5(*a*) illustrates a pointer 205 representing movement of the remote controller 200 displayed on the display 180.

The user may move or rotate the remote controller 200 up and down, side to side (FIG. 5(*b*)), and back and forth (FIG. 5(*c*)). Since the pointer 205 moves in accordance with the movement of the remote controller 200, the remote controller 200 may be referred to as a pointing device.

Referring to FIG. 5(*b*), if the user moves the remote controller 200 to the left, the pointer 205 also moves to the left on the display 180 in correspondence with the movement of the remote controller 200.

A sensor of the remote controller 200 detects the movement of the remote controller 200 and transmits motion information corresponding to the result of the detection to the image display apparatus. Then, the image display apparatus determines the movement of the remote controller 200 based on the motion information received from the remote controller 200, and calculates the coordinates of a target point to which the pointer 205 should be shifted in accordance with the movement of the remote controller 200 based on the result of the determination. The image display apparatus then displays the pointer 205 at the calculated coordinates.

Referring to FIG. 5(*c*), while pressing a predetermined button of the remote controller 200, the user moves the remote controller 200 away from the display 180. Then, a selected area corresponding to the pointer 205 may be zoomed in and enlarged on the display 180. On the contrary, if the user moves the remote controller 200 toward the display 180, the selection area corresponding to the pointer 205 is zoomed out and thus contracted on the display 180. The opposite case is possible. That is, when the remote controller 200 moves away from the display 180, the selection area may be zoomed out and when the remote controller 200 approaches the display 180, the selection area may be zoomed in.

With the predetermined button pressed in the remote controller 200, the up, down, left and right movements of the remote controller 200 may be ignored. That is, when the remote controller 200 moves away from or approaches the display 180, only the back and forth movements of the remote controller 200 are sensed, while the up, down, left and right movements of the remote controller 200 are ignored. Unless the predetermined button is pressed in the remote controller 200, only the pointer 205 moves in accordance with the up, down, left or right movement of the remote controller 200.

The speed and direction of the pointer 205 may correspond to the speed and direction of the remote controller 200.

Figure 6:
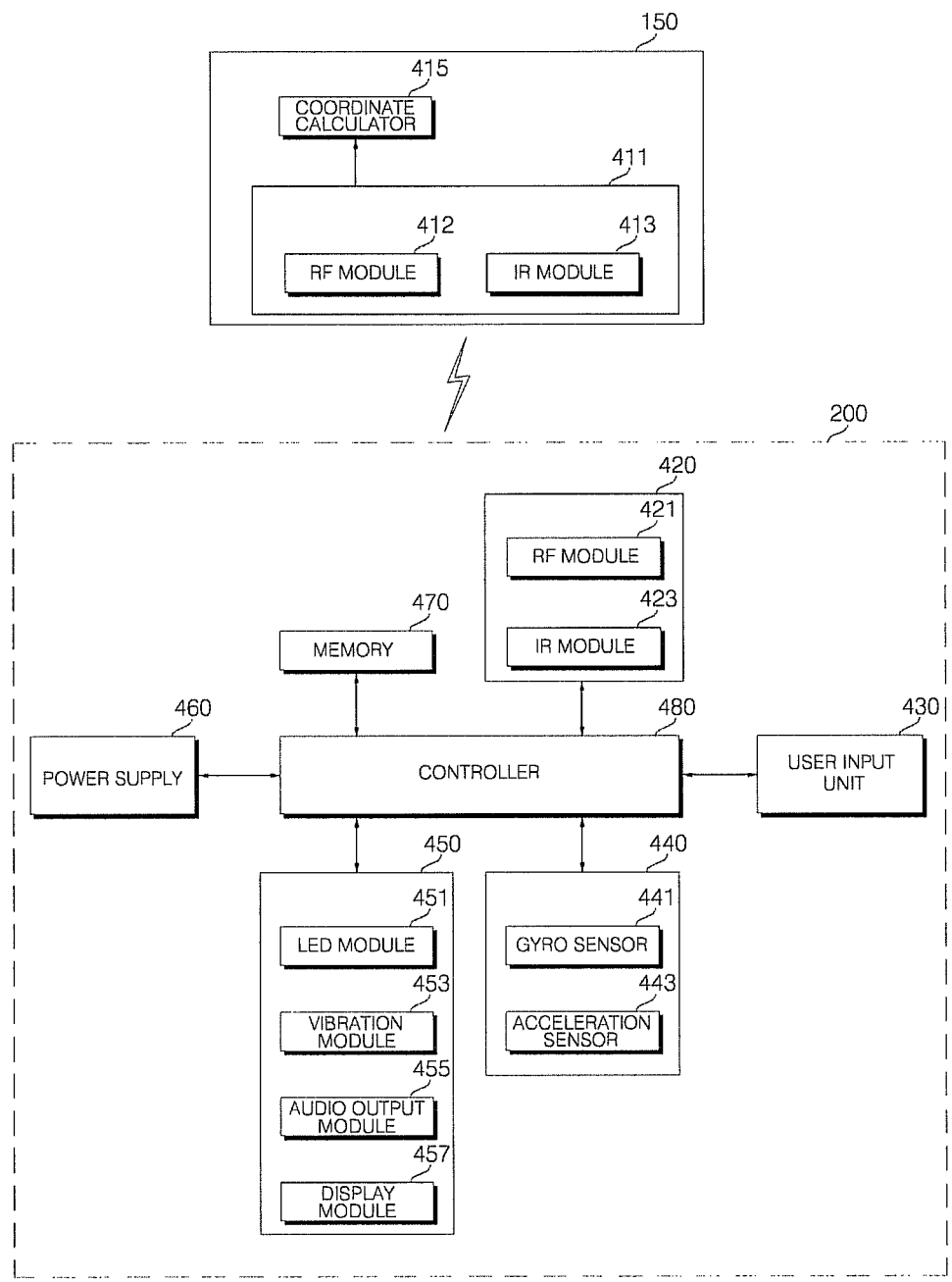
FIG. 6 is a block diagram of the remote controller illustrated in FIG. 3.

FIG. 6 is a block diagram of the remote controller illustrated in FIG. 3.

Referring to FIG. 6, the remote controller 200 may include a wireless communication module 420, a user input unit 430, a sensor unit 440, an output unit 450, a power supply 460, a memory 470, and a controller 480.

The wireless communication module 420 may transmit signals to and/or receive signals from the image display apparatus 100.

In the embodiment of the present invention, the wireless communication module 820 may include an RF module 421 for transmitting RF signals to and/or receiving RF signals from the image display apparatus 100 in conformance to an RF communication standard. The wireless communication module 420 may also include an IR module 823 for transmitting IR signals to and/or receiving IR signals from the image display apparatus 100 in conformance to an IR communication standard.

The remote controller 200 transmits motion information regarding its movement to the image display apparatus 100 through the RF module 421 in the embodiment of the present invention.

The remote controller 200 may also receive signals from the image display apparatus 100 through the RF module 421. The remote controller 200 may transmit commands, such as a power on/off command, a channel switching command, or a sound volume change command, to the image display apparatus 100 through the IR module 423, as needed.

The user input unit 430 may include a keypad, a plurality of buttons, and/or a touch screen. The user may enter commands to the image display apparatus 100 by manipulating the user input unit 430. If the user input unit 430 includes a plurality of hard-key buttons, the user may input various commands to the image display apparatus 100 by pressing the hard-key buttons. Alternatively or additionally, if the user input unit 430 includes a touch screen displaying a plurality of soft keys, the user may input various commands to the image display apparatus 100 by touching the soft keys. The user input unit 430 may also include various input tools other than those set forth herein, such as a scroll key and/or a jog key, which should not be construed as limiting the present invention.

The sensor unit 440 may include a gyro sensor 441 and/or an acceleration sensor 443. The gyro sensor 441 may sense the movement of the remote controller 200, for example, in X-, Yxis directions, and the acceleration sensor 443 may sense the moving speed of the remote controller 200. The sensor unit 440 may further include a distance sensor for sensing the distance between the remote controller 200 and the display 180.

The output unit 450 may output a video and/or audio signal corresponding to a manipulation of the user input unit 430 or a signal transmitted by the image display apparatus 100. The user may easily identify whether the user input unit 430 has been manipulated or whether the image display apparatus 100 has been controlled based on the video and/or audio signal output by the output unit 450.

The output unit 450 may include a Light Emitting Diode (LED) module 451 which is turned on or off whenever the user input unit 430 is manipulated or whenever a signal is received from or transmitted to the image display apparatus 100 through the wireless communication module 420, a vibration module 453 which generates vibrations, an audio output module 455 which outputs audio data, and a display module 457 which outputs an image.

The power supply 460 supplies power to the remote controller 200. If the remote controller 200 is kept stationary for a predetermined time or longer, the power supply 460 may, for example, cut off supply of power to the remote controller 200 in order to save power. The power supply 460 may resume supply of power if a specific key on the remote controller 200 is manipulated.

The memory 470 may store various application data for controlling or operating the remote controller 200. The remote controller 200 may wirelessly transmit signals to and/or receive signals from the image display apparatus 100 in a predetermined frequency band through the RF module 421. The controller 480 of the remote controller 200 may store information regarding the frequency band used for the remote controller 200 to wirelessly transmit signals to and/or wirelessly receive signals from the paired image display apparatus 100 in the memory 470 and may then refer to this information for use at a later time.

The controller 480 provides overall control to the remote controller 200. For example, the controller 480 may transmit a signal corresponding to a key manipulation detected from the user input unit 430 or a signal corresponding to motion of the remote controller 200, as sensed by the sensor unit 440, to the image display apparatus 100 through the wireless communication module 420.

The user input interface 150 of the image display apparatus 100 may include a wireless communication module 451 which wirelessly transmits signals to and/or wirelessly receives signals from the remote controller 200, and a coordinate calculator 415 which calculates coordinates representing the position of the remote controller 200 on the display screen, which is to be moved in accordance with the movement of the remote controller 200.

The user input interface 150 may wirelessly transmit RF signals to and/or wirelessly receive RF signals from the remote controller 200 through the RF module 412. In addition, the user input interface 150 may wirelessly receive IR signals from the remote controller 200 through the IR module 413 according to the IR communication standard.

The coordinate calculator 415 may receive motion information regarding the movement of the remote controller 200 through the wireless communication module 411 and may calculate coordinates (x, y) representing the position of the pointer on a screen of the display 180 by correcting the motion information for possible errors such as user hand tremor.

A signal received in the image display apparatus 100 from the remote controller 200 through the user input interface 150 may be transmitted to the controller 170. Then, the controller 170 may acquire information regarding the movement of the remote controller 200 and information regarding a key manipulation detected from the remote controller 200 from the signal received from the user input interface 150, and may control the image display apparatus 100 based on the acquired information.

In another example, the remote controller 200 may calculate the coordinates of a position to which the pointer is to be shifted in correspondence with its movement and output the coordinates to the user input interface 150 of the image display apparatus 100. In this case, the user input interface 150 may transmit information about the pointer coordinates which was not corrected for possible errors such as user hand tremor to the controller 170.

In a further example, unlike the configuration of the remote controller 200 illustrated in FIG. 6, the coordinate calculator 415 may reside in the controller 170, instead of the user input interface 150.

Figure 7:
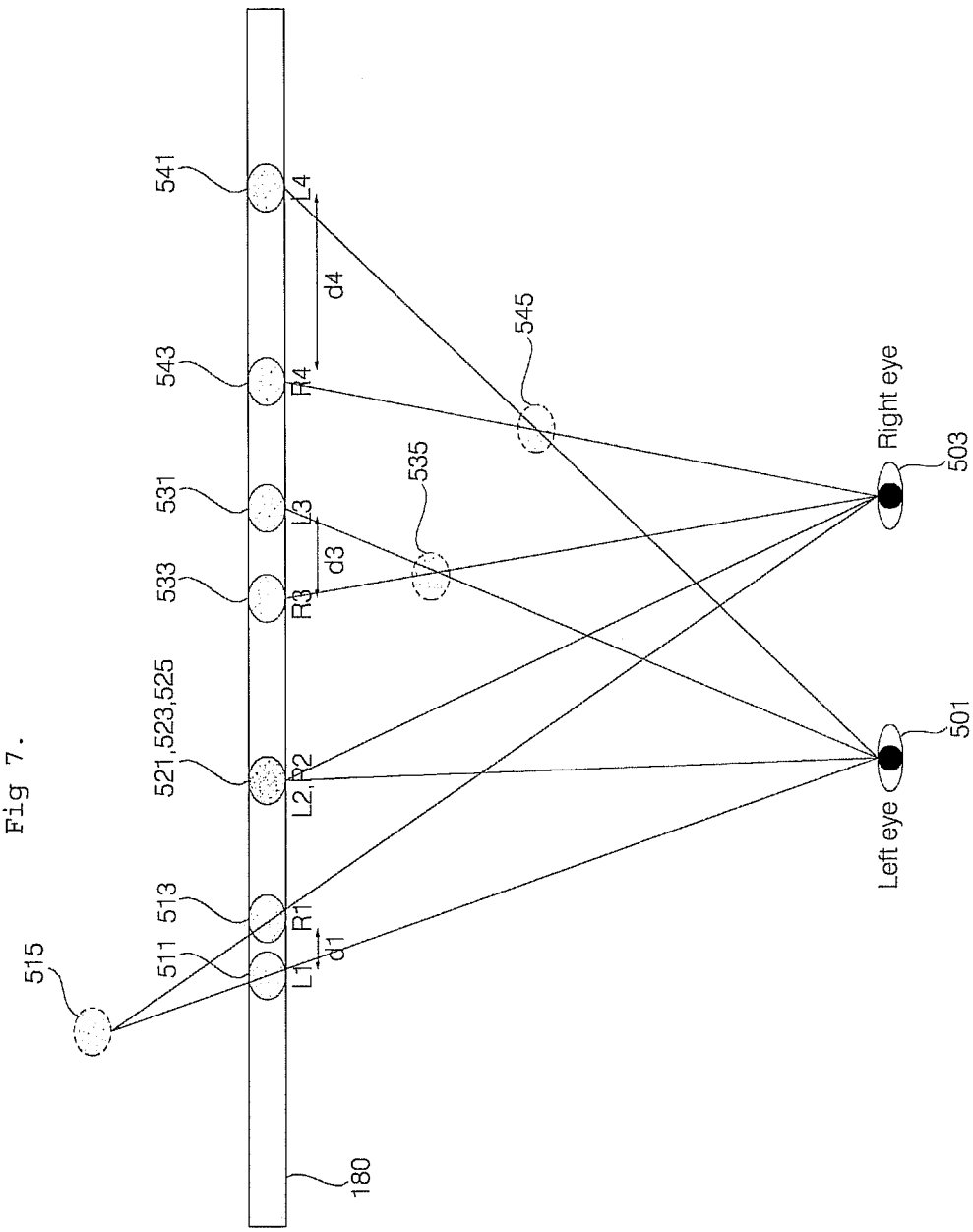
FIG. 7 illustrates formation of 3D images by combining left-eye and right-eye images.
Figure 8:
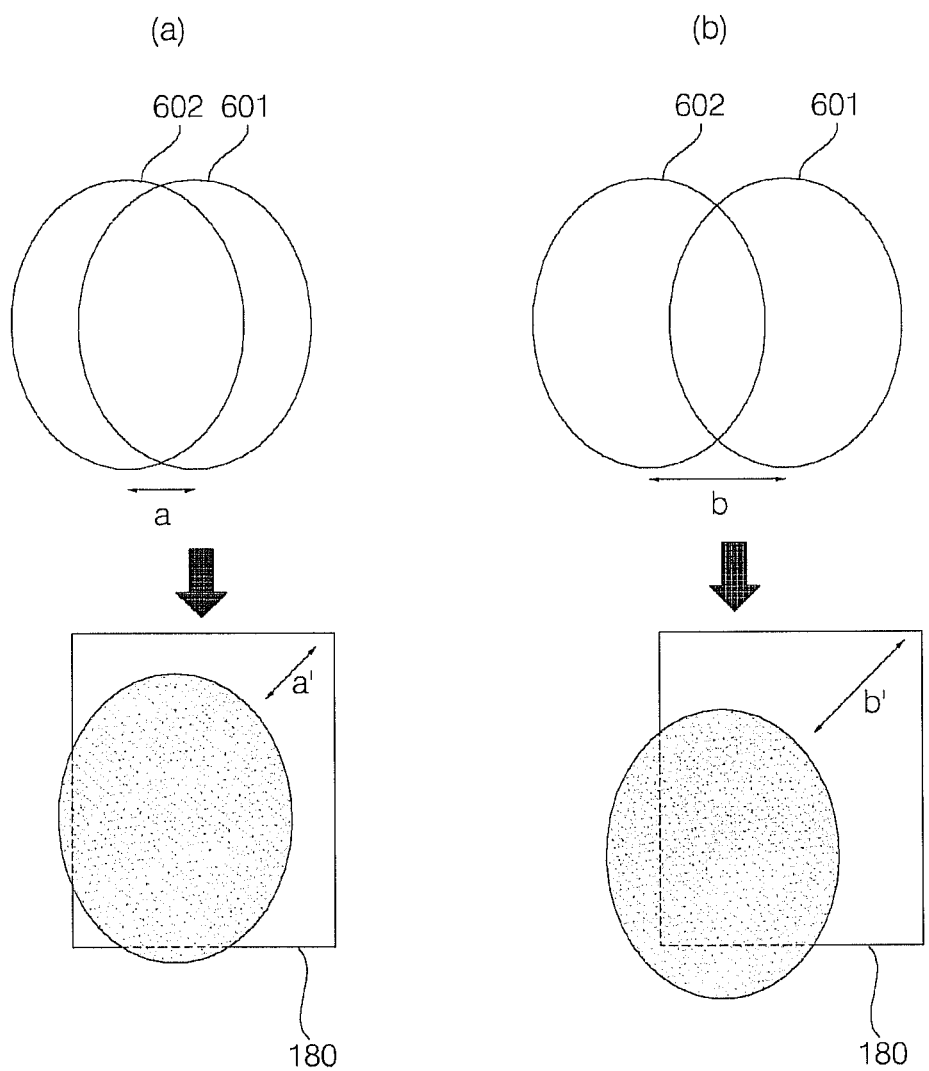
FIG. 8 illustrates different depth illusions of three-dimensional (3D) images according to different disparities between a left-eye image and a right-eye image.

FIG. 7 illustrates formation of 3D images by combining left-eye and right-eye images, and FIG. 8 illustrates different depth illusions according to different disparities between a left-eye image and a right-eye image.

Referring to FIG. 7, there are a plurality of images or objects 515, 525, 535 and 545.

A first object 515 is created by combining a first left-eye image 511 (L1) based on a first left-eye image signal with a first right-eye image 513 (R1) based on a first right-eye image signal, with a disparity dl between the first left-eye and right-eye images 511 and 513. The user sees an image as formed at the intersection between a line connecting a left eye 501 to the first left-eye image 511 and a line connecting a right eye 503 to the first right-eye image 513. Therefore, the user is tricked into perceiving the first object 515 as located behind the display 180.

As a second object 525 is created by overlapping a second left-eye image 521 (L2) with a second right-eye image 523 (R2) on the display 180, thus with a disparity of 0 between the second left-eye and right-eye images 521 and 523. Thus, the user perceives the second object 525 as positioned on the display 180.

A third object 535 is created by combining a third left-eye image 531 (L3) with a third right-eye image 533 (R3), with a disparity d3 between the third left-eye and right-eye images 531 and 533. A fourth object 545 is created by combining a fourth left-eye image 541 (L4) with a fourth right-eye image 543 (R4), with a disparity d4 between the fourth left-eye and right-eye images 541 and 543.

The user perceives the third and fourth objects 535 and 545 at image-formed positions, that is, as positioned before the display 180.

Because the disparity d4 between the fourth left-eye and right-eye images 541 and 543 is larger than the disparity d3 between the third left-eye and right-eye images 531 and 533, the fourth object 545 appears more protruding than the third object 535.

In embodiments of the present invention, the distances between the display 180 and the objects 515, 525, 535 and 545 are represented as depths. When an object is perceived to the user as being positioned behind the display 180, the depth of the object is negative-signed. On the other hand, when an object is perceived to the user as being positioned before the display 180, the depth of the object is positive-signed. Therefore, as an object appears more protruding to the user, it is deeper, that is, its depth is larger.

Referring to FIG. 8, the disparity a between a left-eye image 601 and a right-eye image 602 in FIG. 8(a) is smaller than the disparity b between the left-eye image 601 and the right-eye image 602 in FIG. 8(b). Consequently, the depth a' of a 3D object created in FIG. 8(a) is smaller than the depth b' of a 3D object created in FIG. 8(b).

In the case where a left-eye image and a right-eye image are combined into a 3D image, if the left-eye and right-eye images of 3D images are apart from each other by different disparities, the 3D images are perceived to the user as formed at different positions. This means that the depth of a 3D image or 3D object formed with a left-eye image and a right-eye image in combination may be controlled by adjusting the disparity of the left-eye and right-eye images.

FIG. 9 is a view referred to for describing the operation principles of glasses-free 3D image display apparatuses.

As described before, a glasses-free 3D image display apparatus operate in a lenticular scheme, parallax scheme, or microlens array scheme. Hereinbelow, the lenticular scheme and the parallax scheme will be described. In addition, while the following description is given in the context of multi-viewpoint images being two viewpoints images including a left-eye image and a right-eye image, this is purely exemplary and thus should not be construed as limiting the present invention.

FIG. 9(a) illustrates the lenticular scheme using a lenticular lens. Referring to FIG. 9(a), a block 720 (L) forming a left-eye viewpoint image and a block 710 (R) forming a right-eye viewpoint image may alternate with each other on the display 180. While each block may have a plurality of pixels, it may also include a single pixel. It is assumed herein that each block has one pixel.

In the lenticular scheme, a lenticular lens 195a is provided in the lens unit 195. The lenticular lens 195a disposed in front of the display 180 may change the propagation direction of light emitted from the pixels 710 and 720. For example, the propagation direction of light emitted from the pixels 720 (L) may be changed to be directed toward the left eye 701 of a viewer, whereas the propagation direction of light emitted from the pixels 710 (R) may be changed to be directed toward the right eye 702 of the viewer.

Thus, as the light emitted from the pixels 720 (L) forming the left-eye viewpoint image is combined, the user sees the left-eye viewpoint image. In addition as the light emitted from the pixels 710 (R) forming the right-eye viewpoint image is combined, the user sees the right-eye viewpoint image. Consequently, the viewer can perceive a 3D image without wearing 3D glasses.

FIG. 9(b) illustrates the parallax scheme using a slit array. Referring to FIG. 9(b), the blocks 720 (L) forming the left-eye viewpoint image and the blocks 710 (R) forming the right-eye viewpoint image may be alternatively arranged on the display 180, as in FIG. 9(a). In the parallax scheme, a slit array 195b is provided in the lens unit 195. The slit array lens 195b serves as a barrier, thus steering light emitted from the pixels in a predetermined direction. Therefore, the user sees the left-eye viewpoint image with the left eye 702 and the right-eye viewpoint image with the right eye 701, like the lenticular scheme. Consequently, the viewer can perceive a 3D image without wearing 3D glasses.

FIGS. 10 to 14 are views referred to for describing the operation principle of an image display apparatus that displays multi-viewpoint images.

Figure 10:
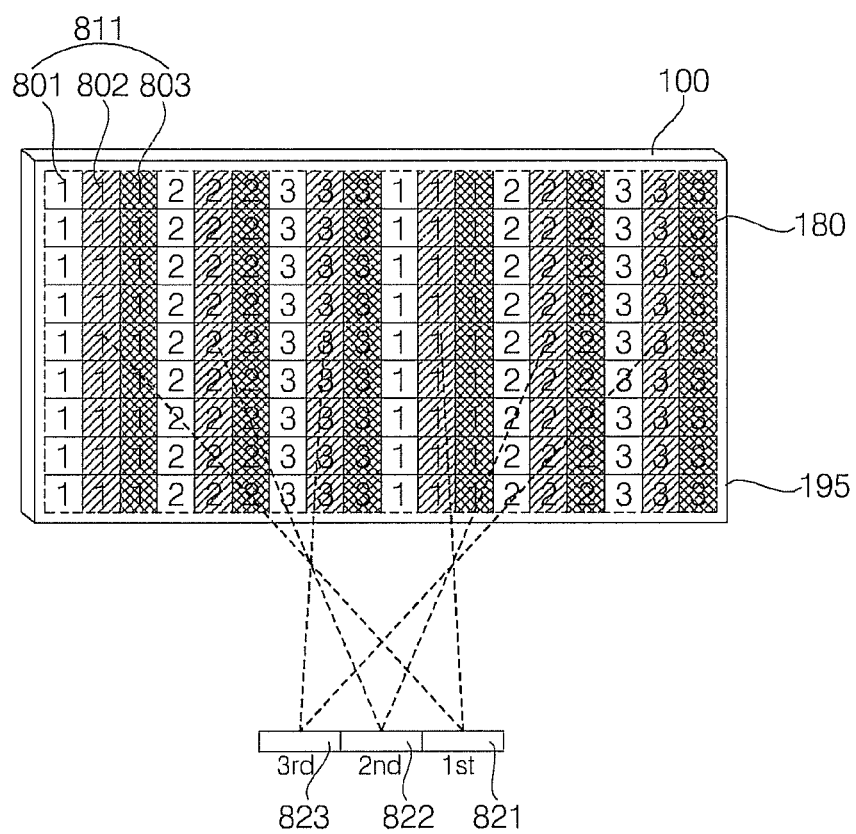

FIG. 10 illustrates the image display apparatus 100 including three viewpoint areas 821, 822 and 823. A part of pixels forming three viewpoint images displayed in the respective three viewpoint areas 821, 822 and 823 may be rearranged on the display 180, as illustrated in FIG. 10. Pixel rearrangement refers to changing the values of pixels displayed on the display 180 and displaying the pixels with the changed values on the display 180, not changing the physical positions of the pixels.

The three viewpoint images may be obtained by capturing an object 910 from different directions, as illustrated in FIG. 11.

First pixels 811 displayed on the display 180 may be divided into first, second and third subpixels 801, 802, and 803. Each of the first, second and third subpixels 801, 802, and 803 may represent one of Red, Green, and Blue.

FIG. 10 illustrates a pattern of rearranging the pixels of three viewpoint images on the display 180, which does not limit the scope of the present invention. The pixels of the three viewpoint images may be rearranged in various patterns on the display 190 according to the lens unit 195.

In FIG. 10, reference numeral 1 denotes the subpixels 801, 802 and 803 of the first viewpoint image, reference numeral 2 denotes the subpixels of the second viewpoint image, and reference numeral 3 denotes the subpixels of the third viewpoint image.

The subpixels denoted by reference numeral 1 may be combined into the first viewpoint image, which is displayed in the first viewpoint area 821. The subpixels denoted by reference numeral 2 may be combined into the second viewpoint image, which is displayed in the second viewpoint area 822. The subpixels denoted by reference numeral 3 may be combined into the third viewpoint image, which is displayed in the third viewpoint area 823.

That is, first, second and third viewpoint images 901, 902 and 903 illustrated in FIG. 11 are images displayed according to the respective viewpoint directions. In addition, the first, second and third viewpoint images 901, 902 and 903 may be images of the object 901 captured from first, second and third viewpoint directions, respectively.

Referring to FIG. 12(a), therefore, if the left and right eyes 922 and 921 of a viewer are respectively positioned in the third and second viewpoint areas 823 and 822, the left eye 922 sees the third viewpoint image 903 and the right eye 921 sees the second viewpoint image 902. Accordingly, the viewer is tricked into perceiving the object 910 as positioned in front of the display 180 based on the principle described before with reference to FIG. 7, as illustrated in FIG. 12(b). In this manner, the viewer perceives a 3D image without wearing 3D glasses. When the left and right eyes 922 and 921 of the viewer are respectively positioned in the second and first viewpoint areas 822 and 821, the viewer can perceive a stereoscopic image (i.e. a 3D image).

If the pixels of multi-viewpoint images are rearranged only in a horizontal direction as illustrated in FIG. 10, the horizontal resolution of the resulting 3D image is reduced to 1/n (n is the number of multi-viewpoint images), compared to that of a 2D image. For example, the horizontal resolution of the 3D image illustrated in FIG. 10 is reduced to ⅓ of that of a 2D image. On the other hand, the 3D image has a vertical resolution equal to that of the multi-viewpoint images 901, 902 and 903 prior to rearrangement.

In the case of a larger number of per-direction viewpoint images (the reason for increasing the number of viewpoint images will be described later with reference to FIG. 14), only the horizontal resolution is decreased. Due to the resulting great imbalance in resolution, the overall quality of 3D images may be degraded.

Figure 13:
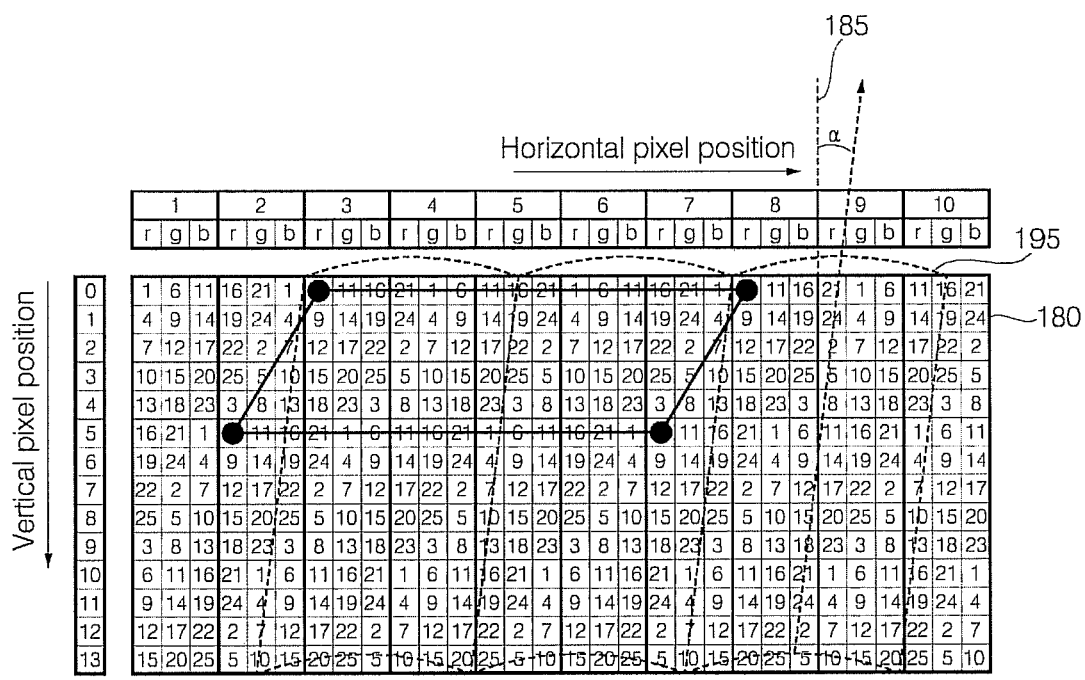

To solve this problem, the lens unit 195 may be tilted at a predetermined angle α with respect to a vertical axis 185 of the display 180 in front of the display 180 and the subpixels of the multi-viewpoint images may be rearranged in various patterns according to the tilted angle of the lens unit 195, as illustrated in FIG. 13. FIG. 13 illustrates an image display apparatus having 25 per-direction multi-viewpoint images according to an embodiment of the present invention. The lens unit 195 may include a lenticular lens or a slit array.

As a result of the lens unit 195 is tilted, a Red subpixel of a sixth viewpoint image may occur every five pixels in both horizontal and vertical directions and the horizontal and vertical resolutions of the resulting 3D image may be decreased 5/1 of those of the pre-rearrangement per-direction multi-viewpoint images. Therefore, the resolutions can be balanced, compared to the conventional method that decreases only the horizontal resolution to ½s.

Figure 14:
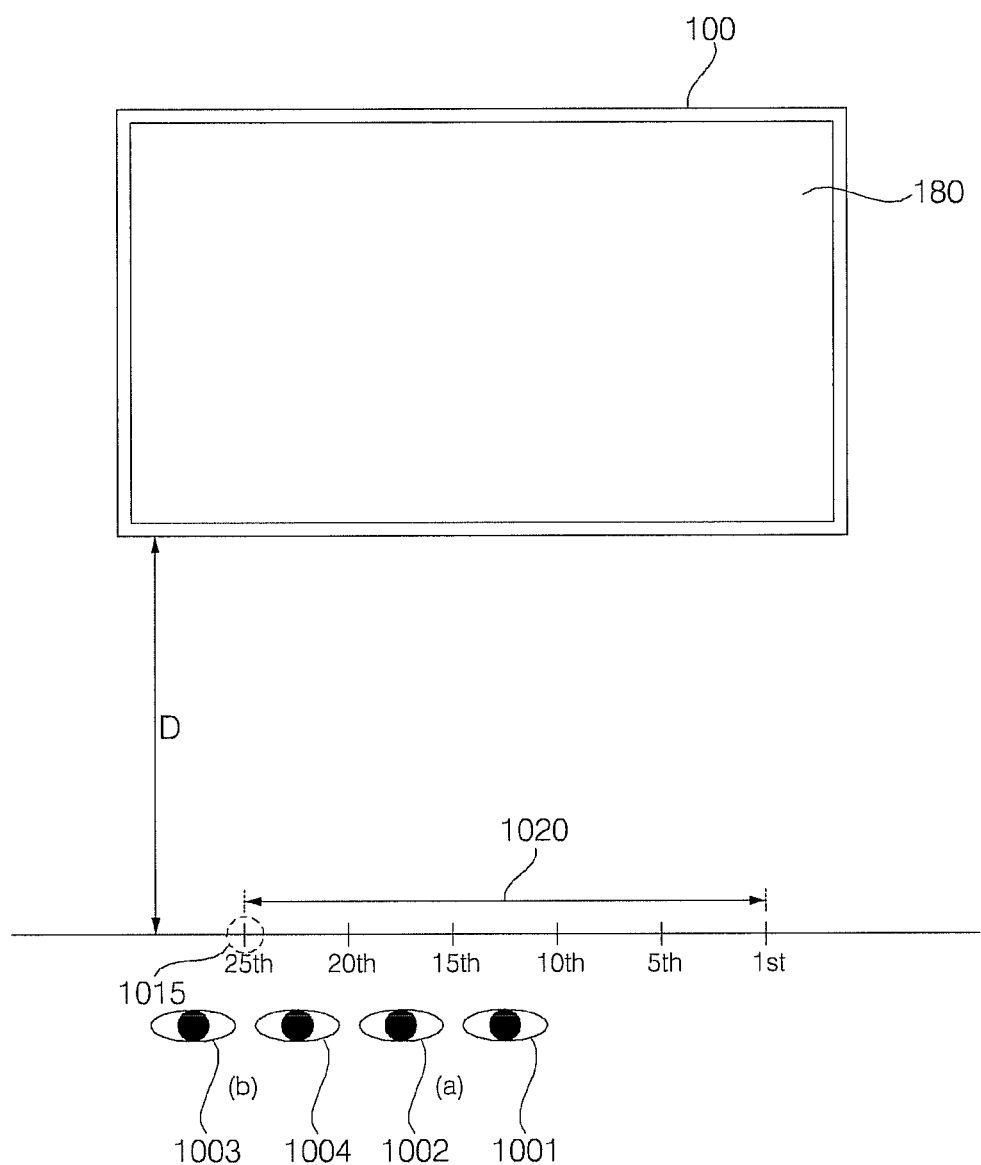

FIG. 14 is a view referred to for describing a sweet zone and a dead zone that are defined in front of the image display apparatus.

The afore-described image display apparatus 100 advantageously gives a stereoscopic feeling to a plurality of viewers without wearing special 3D glasses, but only in a limited area. There is an area in which a viewer can view the best image. This area is defined by an Optimum Viewing Distance (OVD), D and a sweet zone 1020. The OVD, D may be determined according to the distance between the left and right eyes, the pitch of the lens unit, and the focal distance of a lens. The sweet zone 1020 is an area in which multi-viewpoint images are sequentially arranged and thus a viewer can feel the 3D effect stably. As illustrated in FIG. 14, when the viewer is positioned in the sweet zone 1020 as indicated by reference character a, $12^{th}$, $13^{th}$, and $14^{th}$ viewpoint images are perceived to a right eye 1001, whereas $17^{th}$, $18^{th}$, and $19^{th}$ viewpoint images are perceived to a left eye 1002. Thus, the per-direction viewpoint images may be sequentially perceived to the left and right eyes 1002 and 1001. As a consequence, the viewer can feel a stereoscopic feeling due to the left-eye and right-eye images.

On the contrary, if the viewer moves to a dead zone 1015 out of the sweet zone 1020 as indicated by reference character b, for example, if first, second and third viewpoint images are perceived to a left eye 1003 and $23^{th}$, $24^{th}$ and $25^{th}$ viewpoint images are perceived to a right eye 1004, the per-direction viewpoint images are not perceived sequentially to the left and right eyes 1003 and 1004. As a result, the viewer may perceive the left-eye and right-eye images reversely, without feeling the 3D effect. Moreover, when all of the first to $25^{th}$ viewpoint images are perceived to either of the left and right eyes 1003 and 1004, the viewer may feel dizzy.

The size of the sweet zone 1020 may be determined by the number of per-direction multi-viewpoint images, n and a distance corresponding to one viewpoint. Since the distance corresponding to one viewpoint should be smaller than the distance between the eyes of the viewer, there is a limit in increasing the distance corresponding to one viewpoint. Therefore, to increase the size of the sweet zone 1020, the number of per-direction multi-viewpoint images, n should be increased.

Figure 16:
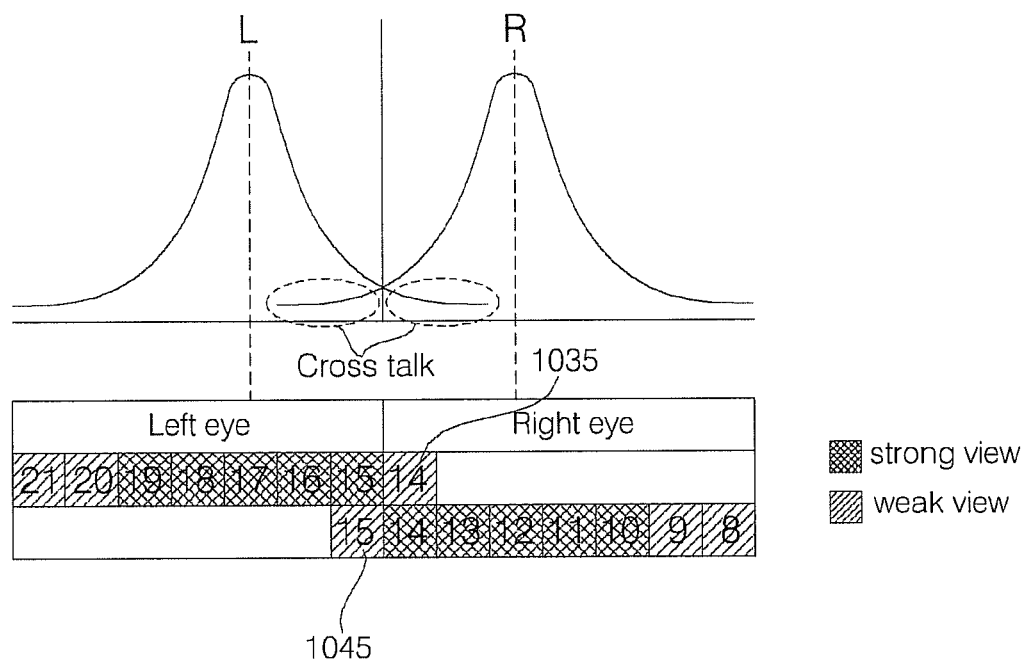
FIGS. 16 to 18 are views referred to for describing the method for operating the image display apparatus, illustrated in FIG. 15.

An increase in the number n of per-direction multi-viewpoint images in turn increases the number of viewpoint images perceived to the left or right eye of the viewer and brings about crosstalk. The crosstalk refers to overlap between weak viewpoint images perceived to both eyes ($14^{th}$ and $15^{th}$ viewpoint images 1035 and 1045) as illustrated in FIG. 16. As the number of per-direction multi-viewpoint images is increased, the number of viewpoint images perceived to the left and right eyes 1002 and 1001 of the viewer is also increased. The resulting increase in the number of viewpoint images overlapped between the left and right eyes 1002 and 1001 may lead to serious crosstalk. For example, in the case of 35 per-direction multi-viewpoint images, three or more viewpoint images may be overlapped between the left and right eyes of the viewer, unlike FIG. 16.

To overcome this problem, an image display apparatus for processing at least a one of viewpoint images causing crosstalk as black is provided according to an embodiment of the present invention. Now a description will be given of the image display apparatus.

Figure 15:
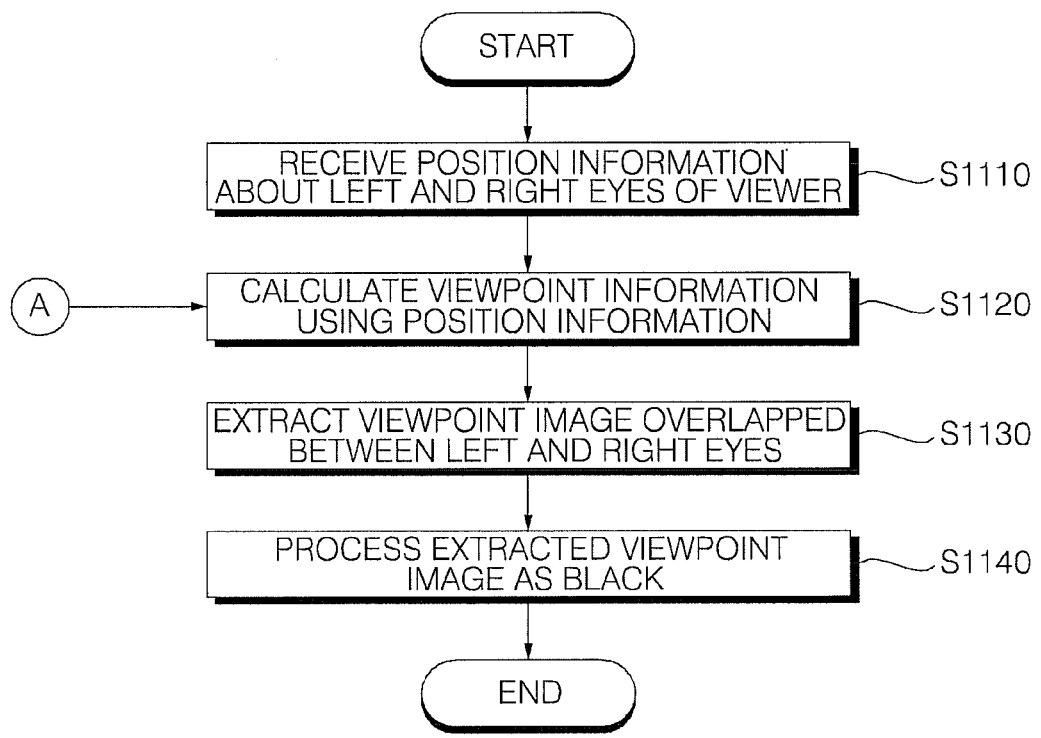
FIG. 15 is a flowchart illustrating a method for operating the image display apparatus according to an embodiment of the present invention.
Figure 17:
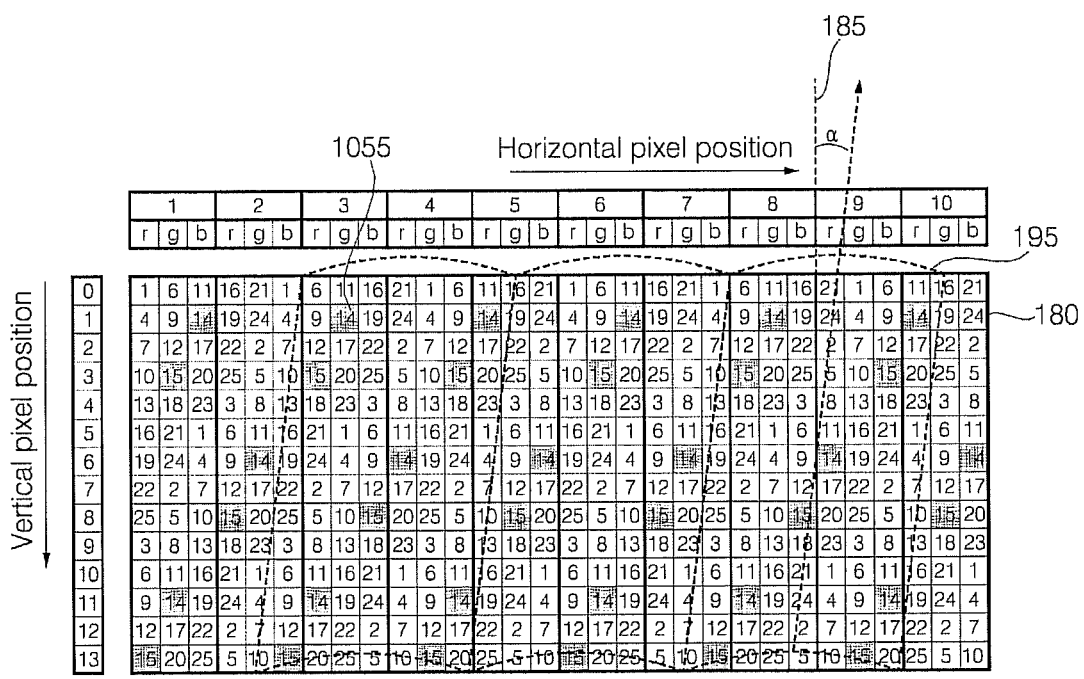
Figure 18:
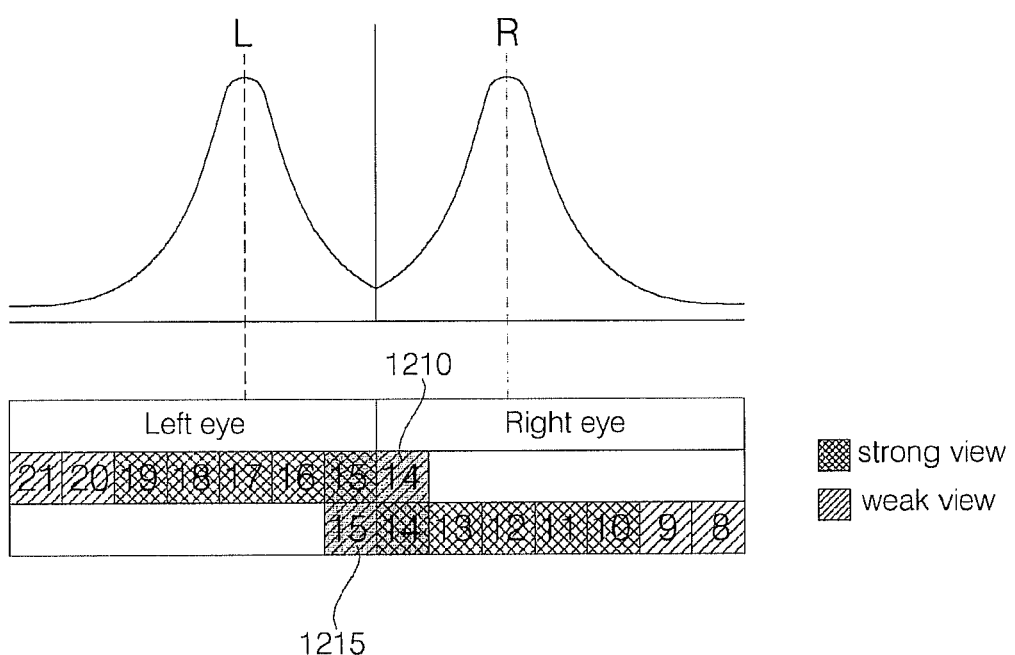

FIG. 15 is a flowchart illustrating a method for operating the image display apparatus according to an embodiment of the present invention and FIGS. 16 to 18 are views referred to for describing the method for operating the image display apparatus, illustrated in FIG. 15.

Referring to FIG. 15, the camera unit 155 may sense the position of a viewer. The camera unit 155 tracks in real time the positions of the left and right eyes of the viewer by eye tracking and provides position information about the viewer to the controller 170. The controller 170 receives the position information about the left and right eyes of the viewer (S1110) and calculates viewpoint information (S1120). The viewpoint information may specify at least one of the numbers of viewpoint images perceived to the left and right eyes, the indexes of the viewpoint images perceived to the left and right eyes, or the indexes of viewpoint images perceived at the centers of the left and right eyes.

The controller 170 may detect viewpoint images that cause crosstalk, based on the viewpoint information.

For example, the graph of FIG. 16 illustrates how strong viewpoint images are perceived to the left eye L and right eye R. As noted from FIG. 16, eight viewpoint images are perceived to each of the left eye L and right eye R. When $14^{th}$ to $21^{th}$ viewpoint images are perceived to the left eye L and $8^{th}$ to $15^{th}$ viewpoint images are perceived to the right eye R, five viewpoints perceived to the center of the left eye L, the $15^{th}$ to $19^{th}$ viewpoint images give strong perception to the left eye L, whereas the $14^{th}$, $20^{th}$ and $21^{th}$ viewpoint images give weak perception to the left eye L. Likewise, five viewpoints perceived to the center of the right eye R, the $10^{th}$ to $14^{th}$ viewpoint images give strong perception to the right eye R, whereas the $8^{th}$, $9^{th}$ and 15th viewpoint images give weak perception to the right eye R.

The left eye L and the right eye R view the $14^{th}$ and $15^{th}$ viewpoint images 1035 and 1045 at the same time, which may cause crosstalk as shown in the graph. As a result, the overlapped view of the left-eye and right-eye images may decrease the 3D effect and make the viewer feel dizzy.

Therefore, the controller 170 extracts viewpoint images overlapped between the left and right eyes L and R based on the calculated viewpoint information (S1130) and processes the extracted viewpoints as black (S1140).

Black data may be inserted into at least one of the sub-pixels of the extracted viewpoint images. For example, if the viewpoint images overlapped between the left and right eyes are the $14^{th}$ and $15^{th}$ viewpoint images 1035 and 1045 as illustrated in FIG. 16, the controller 170 may insert black data into sub-pixels 1055 of the $14^{th}$ and $15^{th}$ viewpoint images 1035 and 1045, as illustrated in FIG. 17.

As black data is inserted into sub-pixels 1055 of the $14^{th}$ and $15^{th}$ viewpoint images 1035 and 1045 in the above manner, the $14^{th}$ and $15^{th}$ viewpoint images 1035 and 1045 are processed as black as illustrated in FIG. 18. Therefore, the crosstalk between the left and right eyes L and R can be reduced and the overlap of viewpoint images between the left and right eyes L and R is eliminated.

Apart from the method for processing overlapped viewpoint images as black, the crosstalk phenomenon can be reduced by changing the brightness or size of the sub-pixels of the overlapped viewpoint images. For instance, if the brightness of the sub-pixels is reduced, the user does not perceive the pixels well and thus the crosstalk can be reduced. The crosstalk can also be reduced by downsizing the pixels.

Figure 19:
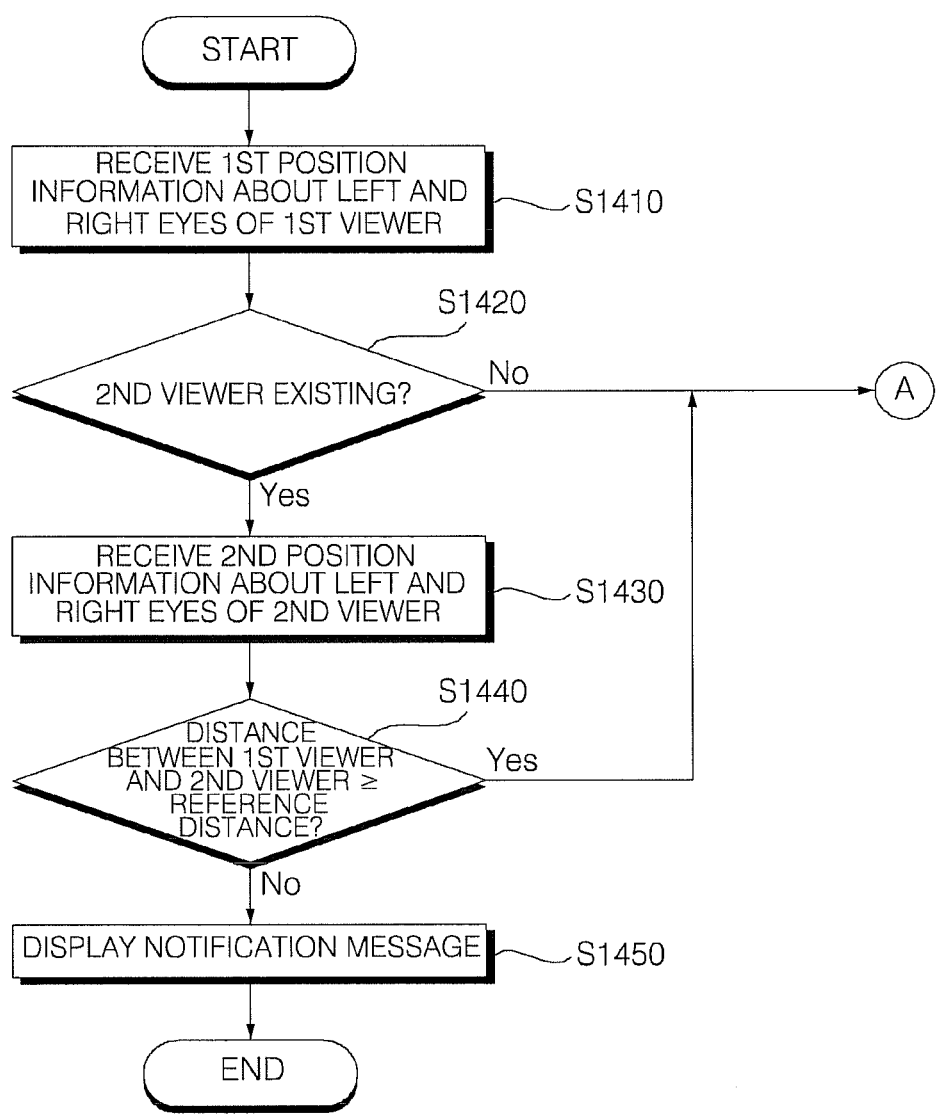
FIG. 19 is a flowchart illustrating a method for operating the image display apparatus according to another embodiment of the present invention.
Figure 20:
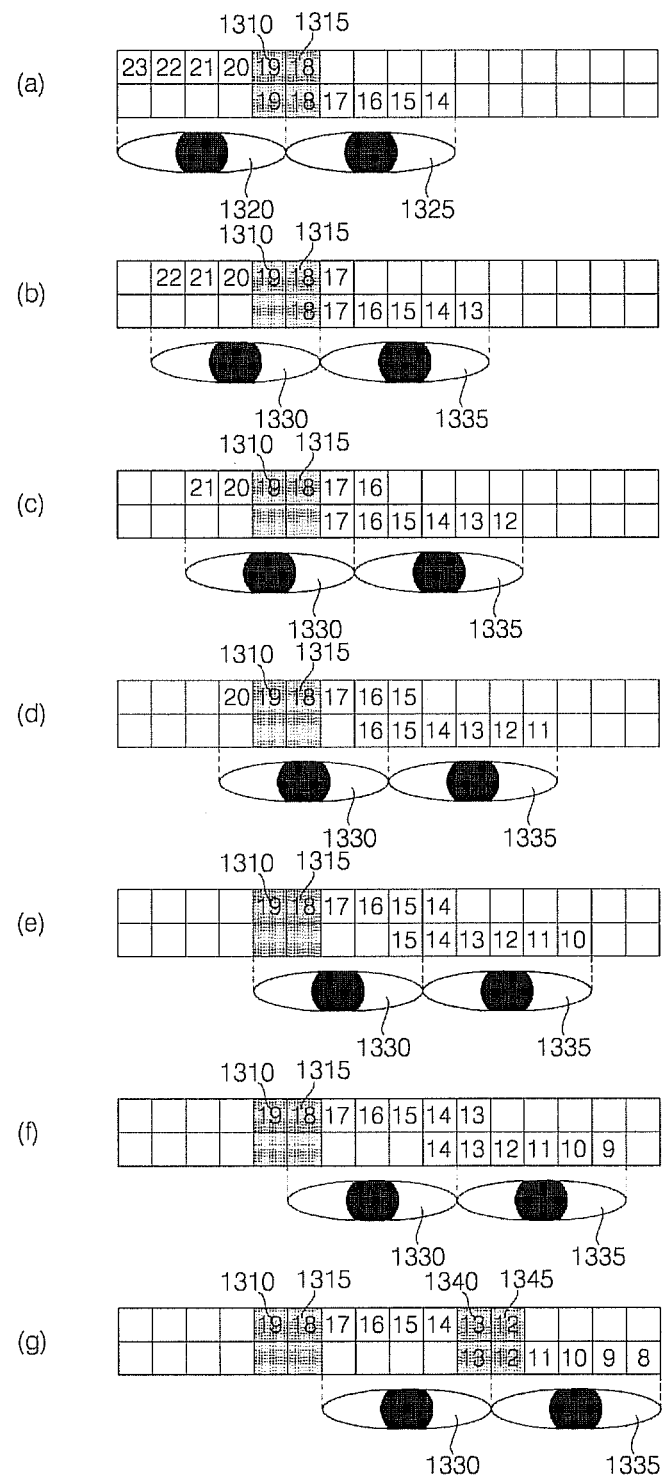
FIGS. 20, 21 and 22 are views referred to for describing the method for operating the image display apparatus, illustrated in FIG. 19.
Figure 21:
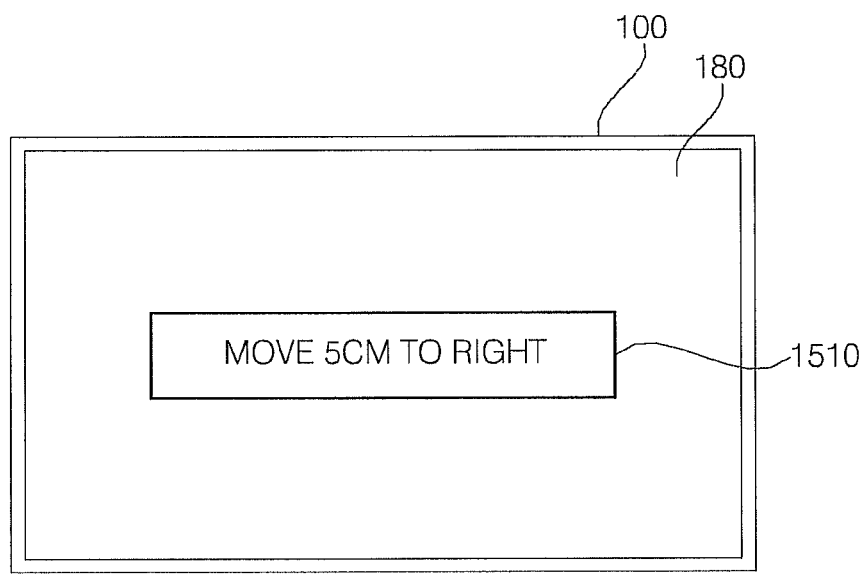
Figure 22:
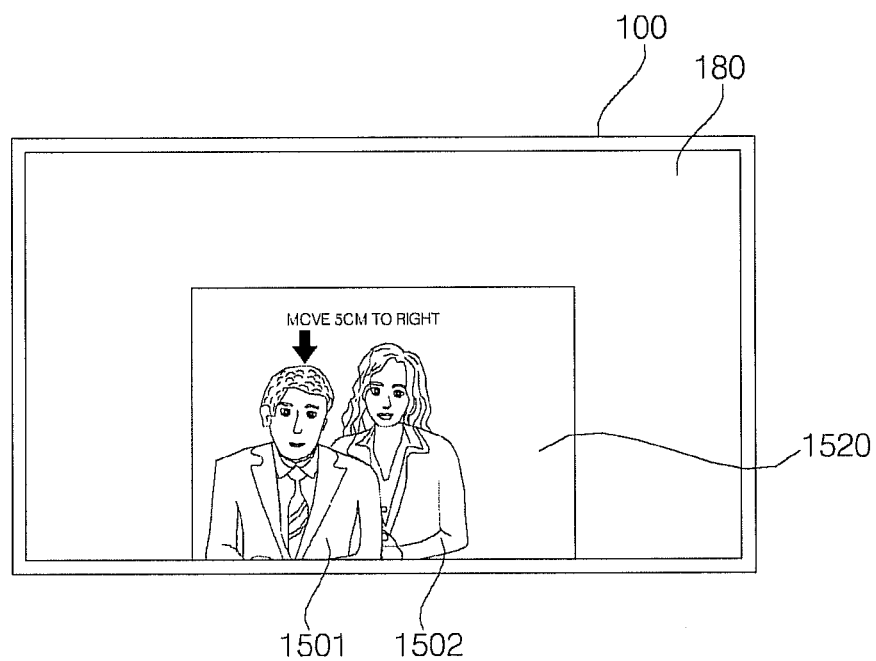

FIG. 19 is a flowchart illustrating a method for operating the image display apparatus according to another embodiment of the present invention, and FIGS. 20, 21 and 22 are views referred to for describing the method for operating the image display apparatus, illustrated in FIG. 19.

FIG. 20 illustrates various exemplary positions of first and second viewers. Specifically, FIG. 20(a) illustrates the positions of the left and right eyes 1320 and 1325 of the first viewer, and FIGS. 20(*b*) to 20(*g*) illustrate the positions of the left and right eyes 1330 and 1335 of the second viewer.

Referring to FIG. 20(*a*), when $18^{th}$ to $23^{rd}$ viewpoint images are perceived to the left eye 1320 of the first viewer and $14^{th}$ to $19^{th}$ viewpoint images are perceived to the right eye 1325 of the first viewer, the viewpoint images overlapped between the left and right eyes 1320 and 1325, that is, the $18^{th}$ and $19^{th}$ viewpoint images 1315 and 1310 may be processed as black according to the operation method of FIG. 15.

Referring to FIG. 20(*b*), if the second viewer is apart from the first viewer by one viewpoint area, the $19^{th}$ viewpoint image 1310 processed as black is strongly perceived to the left eye 1330 of the second viewer because the $18^{th}$ and $19^{th}$ viewpoint images 1315 and 1310 are processed as black for the first viewer. Therefore, there is problem that the second viewer sees black image.

In the case where the second viewer is apart from the first viewer by two viewpoint areas as illustrated in FIG. 20(*c*) or by three viewpoint areas as illustrated in FIG. 20(*d*), the left eye 1330 of the second viewer also perceives the $18^{th}$ and $19^{th}$ viewpoint images 1315 and 1310 processed as black strongly and thus sees black images.

Similarly, the left eye 1330 of the second viewer may also perceive the $18^{th}$ viewpoint image 1315 processed as black strongly and thus may see a black image in the illustrated case of FIG. 20(*e*).

In contrast, the left eye 1330 of the second viewer may perceive the $18^{th}$ viewpoint image 1315 processed as black weakly and thus may not see a black image.

If the second viewer is apart from the first viewer by six viewpoint areas as illustrated in FIG. 20(*g*), the $18^{th}$ and $19^{th}$ viewpoint images 1315 and 1310 may be processed stably as black for the left and right eyes 1320 and 1325 of the first viewer, while the $12^{th}$ and $13^{th}$ viewpoint images 1345 and 1340 may be processed stably as black for the left and right eyes 1330 and 1335 of the second viewer.

To solve the problem encountered with a second viewer's viewing a black image due to insertion of black data for a first viewer as illustrated in FIGS. 20(*b*) to 20(*e*), an embodiment of the present invention provides an image display apparatus for displaying an notification message to the viewers. The image display apparatus will be described below.

Referring to FIG. 19, the camera unit 155 senses the position of the first viewer. The camera unit 155 tracks in real time the positions of the left and right eyes of a first viewer by eye tracking and transmits first position information about the left and right eyes of the first viewer to the controller 170. The camera unit 155 determines whether a second viewer is present in addition to the first viewer (S1420).

In the absence of the second viewer, the controller 170 calculates first viewpoint information based on the first position information and extracts viewpoint images overlapped between the left and right eyes of the first viewer in the manner described before with reference to FIG. 15 (S1130) and processes the overlapped viewpoint images as black (S1140).

In the presence of the second viewer, the camera unit 155 tracks in real time the positions of the left and right eyes of the second viewer by eye tracking and transmits second position information about the left and right eyes of the second viewer to the controller 170.

The camera unit 155 may be implemented into a single camera and thus may sequentially track the positions of the first and second viewers. Alternatively, the camera unit 155 may include a plurality of cameras and thus may simultaneously track the positions of the first and second viewers in real time.

The controller 170 may calculate second viewpoint information based on the second position information. The controller 170 determines whether the distance between the first and second viewers is equal to or larger than a reference distance by comparing the first position information with the second position information (S1440).

The reference distance may be determined based on the first viewpoint information or the second viewpoint information. For example, if five viewpoint images are perceived to the left or right eye of each of the first and second viewers, the reference distance that allows stable insertion of black data for the first and second viewers may be determined to be six viewpoint areas (refer to FIG. 20(*g*)). Therefore, the controller 170 may determine whether to display a notification message by checking whether the second viewer is apart to the left or to the right from the first viewer by six or more viewpoint areas.

As the number of viewpoint images perceived to the left or right eyes of the first and second viewers is decreased, the reference distance may also be decreased. In contrast, as the number of viewpoint images perceived to the left or right eyes of the first and second viewers is increased, the reference distance may also be increased.

If the distance between the first and second viewers is equal to or larger than the reference distance, the controller 170 calculates first and second viewpoint information respectively based on the first and second position information (S1120), extracts viewpoint images overlapped between the left and right eyes of the first viewer and viewpoint images overlapped between the left and right eyes of the second viewer (S1130), and processes at least one of the extracted viewpoint images as black (S1140), as described before with reference to FIG. 15.

On the other hand, if the distance between the first and second viewers is smaller than the reference distance, the controller 170 displays a notification message on the display 180 (S1450). The notification message may also be output as a notification sound, to which the present invention is not limited.

FIGS. 21 and 22 illustrate screens on which a notification message is displayed according to an embodiment of the present invention.

Referring to FIG. 21, a notification message 1510 may a message prompting the first or second viewer to move. The notification message 1510 may be displayed only to one of the first and second viewers. For example, if the notification image 1510 is displayed in the $11^{th}$, $12^{th}$, and $13^{th}$ viewpoint images as illustrated in FIG. 20(*e*), the first viewer may not see the notification image 1510 because the $11^{th}$, $12^{th}$, and $13^{th}$ viewpoint images are not perceived to the left and right eyes 1320 and 1325 of the first viewer, while the second viewer may see the notification image 1510 because the $11^{th}$, $12^{th}$, and $13^{th}$ viewpoint images are perceived to the right eye 1335 of the second viewer.

The notification message 1510 may notify the first or second viewer of at least one of a direction to move or a minimum distance to move.

Referring to FIG. 22, the controller 170 may capture first and second viewers 1501 and 1502 through the camera unit 155, display a captured image 1520 on the display 180, and display a notification message on the image 1520. The controller 170 may also control selection of one of the first and second viewers 1501 and 1502 and display of a message prompting the selected viewer to move.

The controller 170 may select a viewer farther from the display 180 between the first and second viewers 1501 and 1502 to control display of the message prompting the selected viewer to move.

As is apparent from the above description, crosstalk is reduced by processing at least one of viewpoint images perceived overlapped between the left and right eyes of a viewer. Thus a 3D image can be displayed stably. Furthermore, even when a plurality of viewers are viewing a 3D image, the 3D image can be displayed stably by prompting a user to move by means of a notification message. Accordingly, user convenience can be increased.

The image display apparatus and the method for operating the same according to the foregoing exemplary embodiments are not restricted to the exemplary embodiments set forth herein. Therefore, variations and combinations of the exemplary embodiments set forth herein may fall within the scope of the present invention.

The method for operating an image display apparatus according to the foregoing exemplary embodiments may be implemented as code that can be written on a computer-readable recording medium and thus read by a processor. The computer-readable recording medium may be any type of recording device in which data is stored in a computer-readable manner. Examples of the computer-readable recording medium include a ROM, a RAM, a CD-ROM, a magnetic tape, a floppy disc, an optical data storage, and a carrier wave (e.g., data transmission over the Internet). The computer-readable recording medium can be distributed over a plurality of computer systems connected to a network so that computer-readable code is written thereto and executed therefrom in a decentralized manner. Programs, code, and code segments to realize the embodiments herein can be construed by one of ordinary skill in the art.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An image display apparatus comprising:
a display for displaying multi-viewpoint images;
a lens unit disposed in front of the display, for separating the multi-viewpoint images according to directions;
a controller for, when at least one of viewpoint images perceived to left and right eyes of a first viewer are overlapped between the left and right eyes of the first viewer, controlling processing of at least one of the overlapped viewpoint images as black, and
a camera unit to track positions of the left and right eyes of the first viewer and transmit, to the controller, first position information, the first position information being information about the tracked positions, wherein the controller determines first viewpoint information about the left and right eyes of the first viewer using the first position information,
wherein the controller receives second position information being information about positions of left and right eyes of a second viewer, the controller calculates second viewpoint information about the left and right eyes of the second viewer using the second position information, and when a distance between the first viewer and the second viewer is smaller than a reference distance that allows stable insertion of black data, the controller controls the display to display a notification message,
wherein the notification message includes at least one of a direction to move for the first and second viewer or a minimum distance to move for the first or second viewer, and
wherein the controller, when the distance between the first viewer and the second viewer is equal to or larger than a reference distance, controls to process at least one of the overlapped viewpoint images as black.

2. The image display apparatus according to claim 1, wherein the number of viewpoint images processed as black is proportional to the number of the multi-viewpoint images.

3. The image display apparatus according to claim 1, wherein the first viewpoint information includes at least one of the numbers of viewpoint images perceived to the left and right eyes of the first viewer, indexes of the viewpoint images perceived to the left and right eyes of the first viewer, or indexes of viewpoint images perceived to centers of the left and right eyes of the first viewer.

4. The image display apparatus according to claim 1, wherein the reference distance is determined based on the first or second viewpoint information.

5. The image display apparatus according to claim 1, wherein the notification message prompts the first or second viewer to move.

6. The image display apparatus according to claim 1, wherein the lens unit includes a lenticular lens.

7. The image display apparatus according to claim 6, wherein the lenticular lens is inclined at a predetermined angle with respect to the display.

8. A method for operating an image display apparatus that displays multi-viewpoint images, the method comprising:
receiving first position information, the first position information being information about positions of left and right eyes of a first viewer;
determining viewpoint images perceived to the left eye of the first viewer and viewpoint images perceived to the right eye of the first viewer, using the first position information;
processing, when at least one of the viewpoint images perceived to the left and right eyes of the first viewer are overlapped between the left and right eyes of the first viewer, at least one of the overlapped viewpoint images as black and displaying the viewpoint images including the processed viewpoint images;
calculating first viewpoint information using the first position information,
receiving second position information, the second position information being information about positions of the left and right eyes of a second viewer;
calculating second viewpoint information about the left and right eyes of the second viewer using the second position information; and
displaying a notification message, when a distance between the first viewer and the second viewer is smaller than a reference distance that allows stable insertion of black data, wherein the notification message includes at least one of a movement direction to move for the first or second viewer or a minimum distance to move for the first or second viewer,
wherein the processing includes, when the distance between the first viewer and the second viewer is equal to or larger than a reference distance, processing of at least one of the overlapped viewpoint images as black.

9. The method according to claim 8, wherein the first position information is acquired by eye tracking.

10. The method according to claim 8, wherein the first viewpoint information includes at least one of the numbers of viewpoint images perceived to the left and right eyes of the first viewer, indexes of the viewpoint images, or indexes of viewpoint images perceived to centers of the left and right eyes of the first viewer.

11. The method according to claim 8, wherein the reference distance is determined based on the first or second viewpoint information.

12. The method according to claim 8, wherein the notification message prompts the first or second viewer to move.

* * * * *